(12) United States Patent  
Shiotsu et al.

(10) Patent No.: US 10,883,547 B2  
(45) Date of Patent: Jan. 5, 2021

(54) DOG CLUTCH AND TRANSMISSION

(71) Applicants: KABUSHIKI KAISHA TOYOTA CHUO KENKYUSHO, Nagakute (JP); AISIN AI CO., LTD., Nishio (JP)

(72) Inventors: Isamu Shiotsu, Nagakute (JP); Shinichi Takeuchi, Nisshin (JP); Akihiko Ichikawa, Toyota (JP); Junichi Muraoka, Aichi-gun (JP); Tomohiro Yoshimura, Toyota (JP); Jun Yabuta, Nagoya (JP); Yuuki Masui, Nukata-gun (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 91 days.

(21) Appl. No.: 16/334,488

(22) PCT Filed: Jan. 30, 2018

(86) PCT No.: PCT/JP2018/003047  
§ 371 (c)(1),  
(2) Date: Mar. 19, 2019

(87) PCT Pub. No.: WO2018/173488  
PCT Pub. Date: Sep. 27, 2018

(65) Prior Publication Data  
US 2019/0242442 A1 Aug. 8, 2019

(30) Foreign Application Priority Data  
Mar. 22, 2017 (JP) .................. 2017-055500

(51) Int. Cl.  
*F16D 11/10* (2006.01)  
*F16D 23/12* (2006.01)  
(Continued)

(52) U.S. Cl.  
CPC .............. *F16D 11/10* (2013.01); *F16D 21/04* (2013.01); *F16D 23/12* (2013.01); *F16H 3/089* (2013.01);  
(Continued)

(58) Field of Classification Search  
CPC .... F16D 11/10; F16D 2011/006; F16D 21/04; F16D 23/02; F16D 23/12;  
(Continued)

(56) References Cited

U.S. PATENT DOCUMENTS 3,780,840 A * 12/1973 Thomas .................. F16H 63/30  
192/48.91  
2013/0228027 A1 9/2013 Ikeya et al.  
(Continued)

FOREIGN PATENT DOCUMENTS

JP 5707119 B2 4/2015  
JP 2017026090 A * 2/2017  
(Continued)

OTHER PUBLICATIONS

May 5, 2018 International Search Report issued in International Patent Application No. PCT/JP2018/003047.

*Primary Examiner* — Richard M Lorence  
(74) *Attorney, Agent, or Firm* — Oliff PLC

(57) ABSTRACT

A dog clutch includes a gear (40) mounted on a power transmission shaft (30), first and second dog rings (10, 20), a fork (60), springs (65), and cam grooves (31). The cam grooves (31) each include a first slope surface (36) inclined from the axial direction toward the positive rotation direction as the first slope surface (36) approaches the gear (40) and a second parallel surface (37) parallel to the axial direction. The first dog ring (10) includes first cam protrusions (16) to be engaged with the respective first slope surfaces (36), and the second dog ring (20) includes second  
(Continued)

cam protrusions (26) to be engaged with the respective second parallel surfaces (37). This structure prevents the dog rings and the fork from coming into contact with each other, thereby avoiding generation of abrasion and increasing the transmission efficiency.

4 Claims, 15 Drawing Sheets

(51) Int. Cl.
    *F16D 21/04*     (2006.01)
    *F16H 3/089*     (2006.01)
    *F16H 63/30*     (2006.01)

(52) U.S. Cl.
    CPC ....... *F16H 63/30* (2013.01); *F16D 2023/123* (2013.01); *F16H 2063/3093* (2013.01)

(58) Field of Classification Search
    CPC .... F16D 2023/123; F16H 3/089; F16H 63/30; F16H 2063/3093; F16H 2063/3096
    See application file for complete search history.

(56) References Cited

U.S. PATENT DOCUMENTS

| | | | |
|---|---|---|---|
| 2017/0051811 A1* | 2/2017 | Takeuchi | F16H 63/30 |
| 2018/0119750 A1 | 5/2018 | Yoshimura et al. | |
| 2020/0088241 A1* | 3/2020 | Asada | F16D 11/10 |

FOREIGN PATENT DOCUMENTS

| | | | | |
|---|---|---|---|---|
| JP | 2018-071633 A | 5/2018 | | |
| WO | WO-2011088856 A1 * | 7/2011 | ........... | F16D 25/061 |
| WO | WO-2016152286 A1 * | 9/2016 | ............ | F16H 3/089 |
| WO | WO-2017017724 A1 * | 2/2017 | ............ | F16D 23/02 |

* cited by examiner

[Fig. 1]
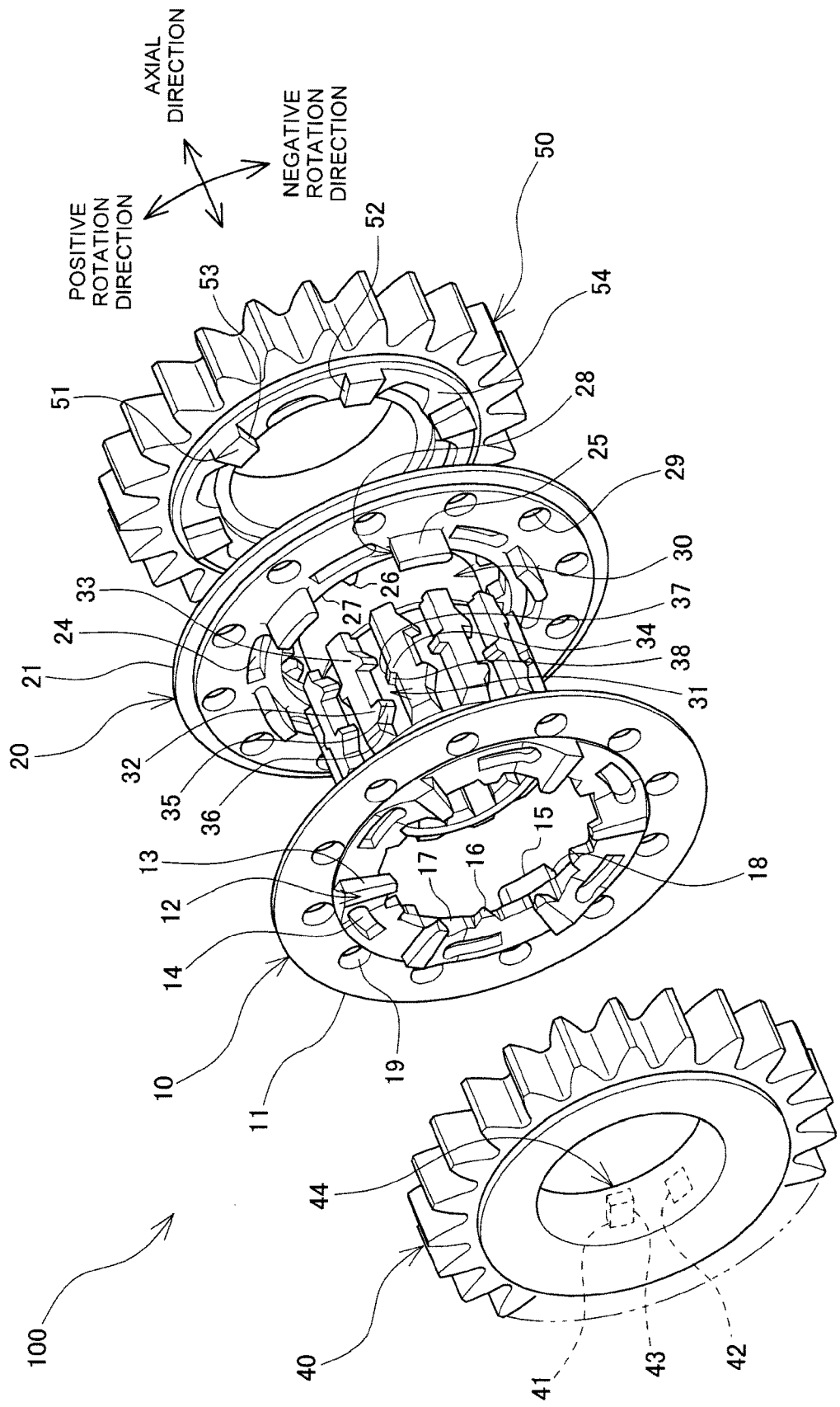

[Fig. 2]
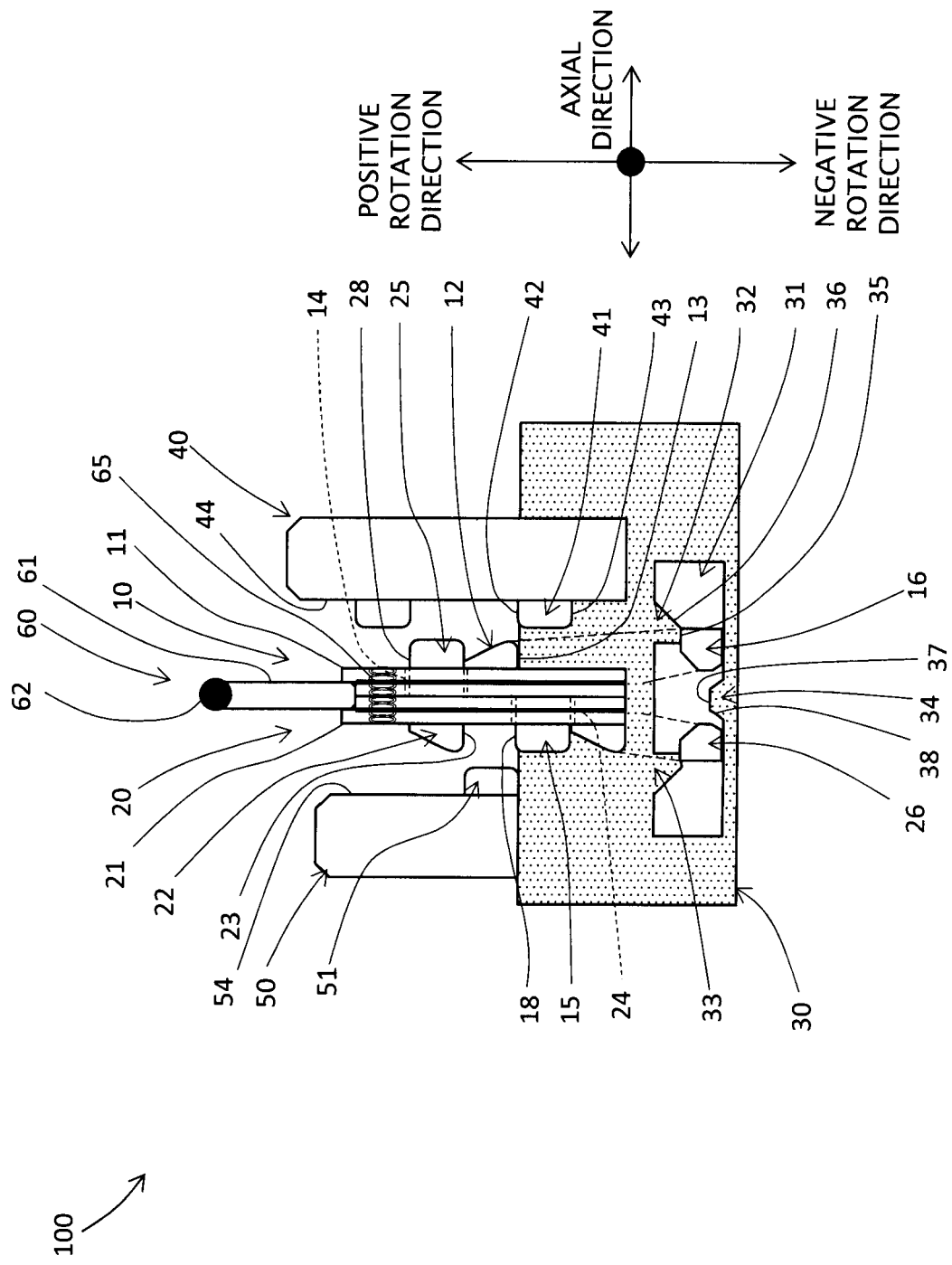

[Fig. 3]
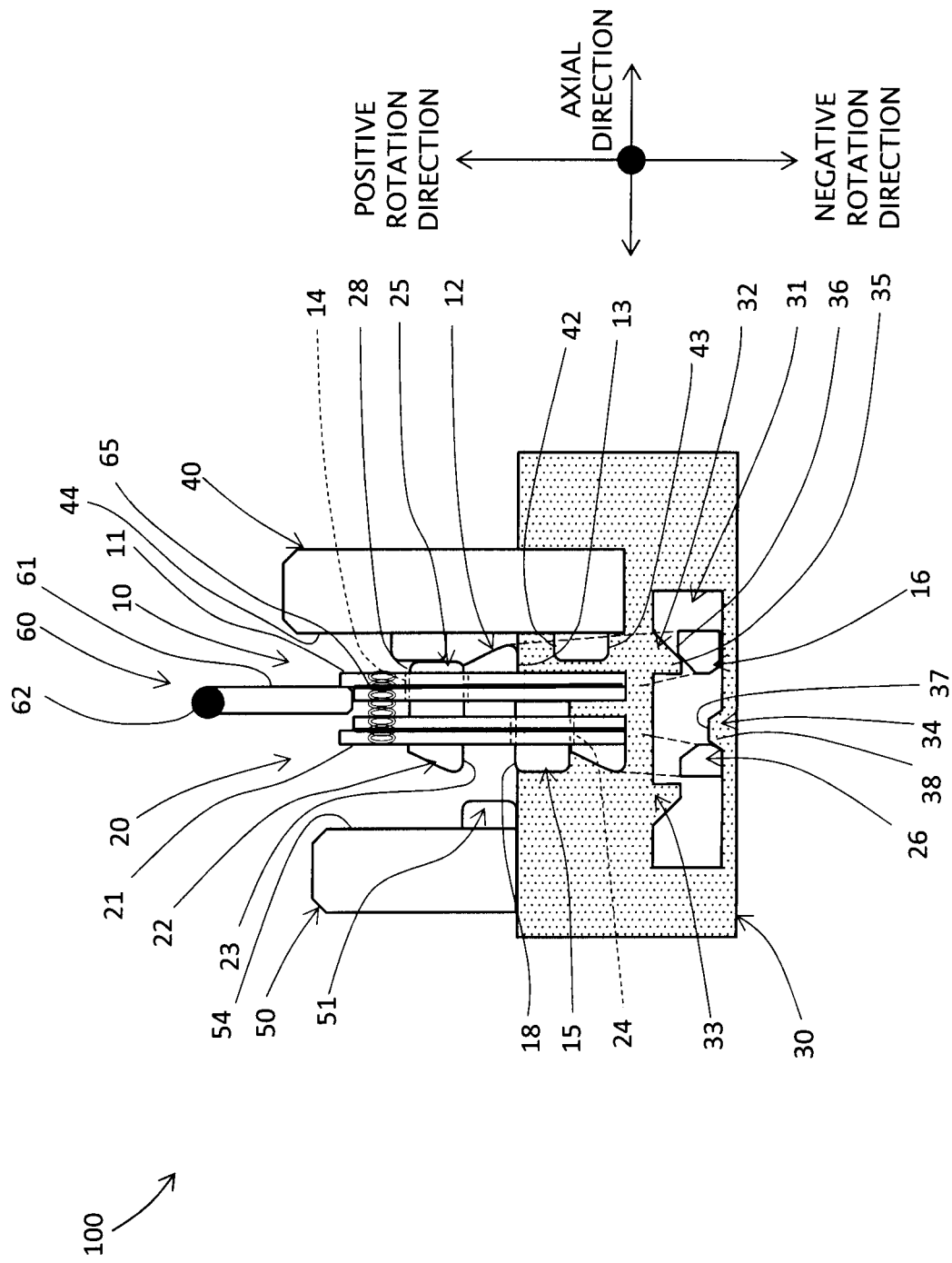

[Fig. 4]
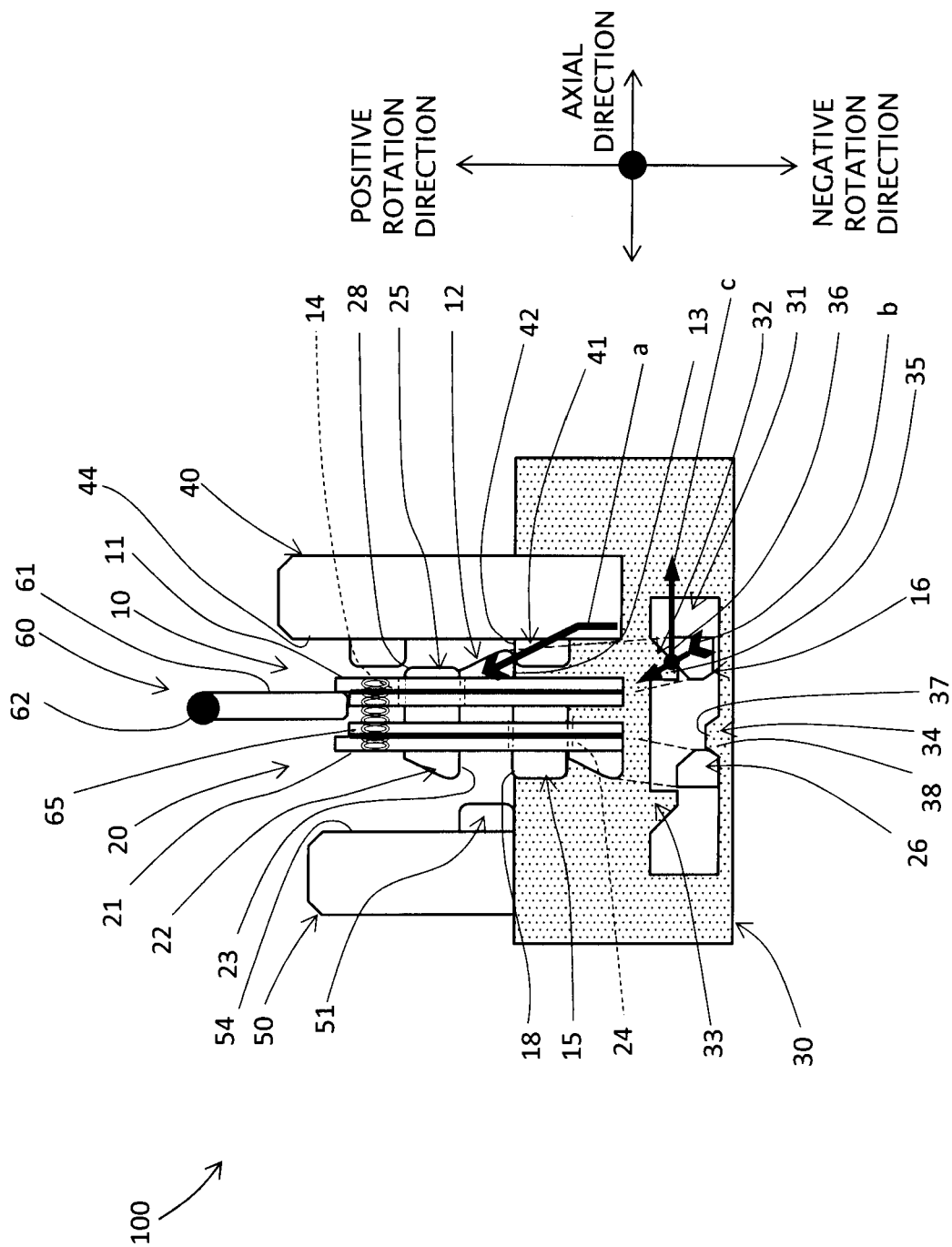

[Fig. 5]
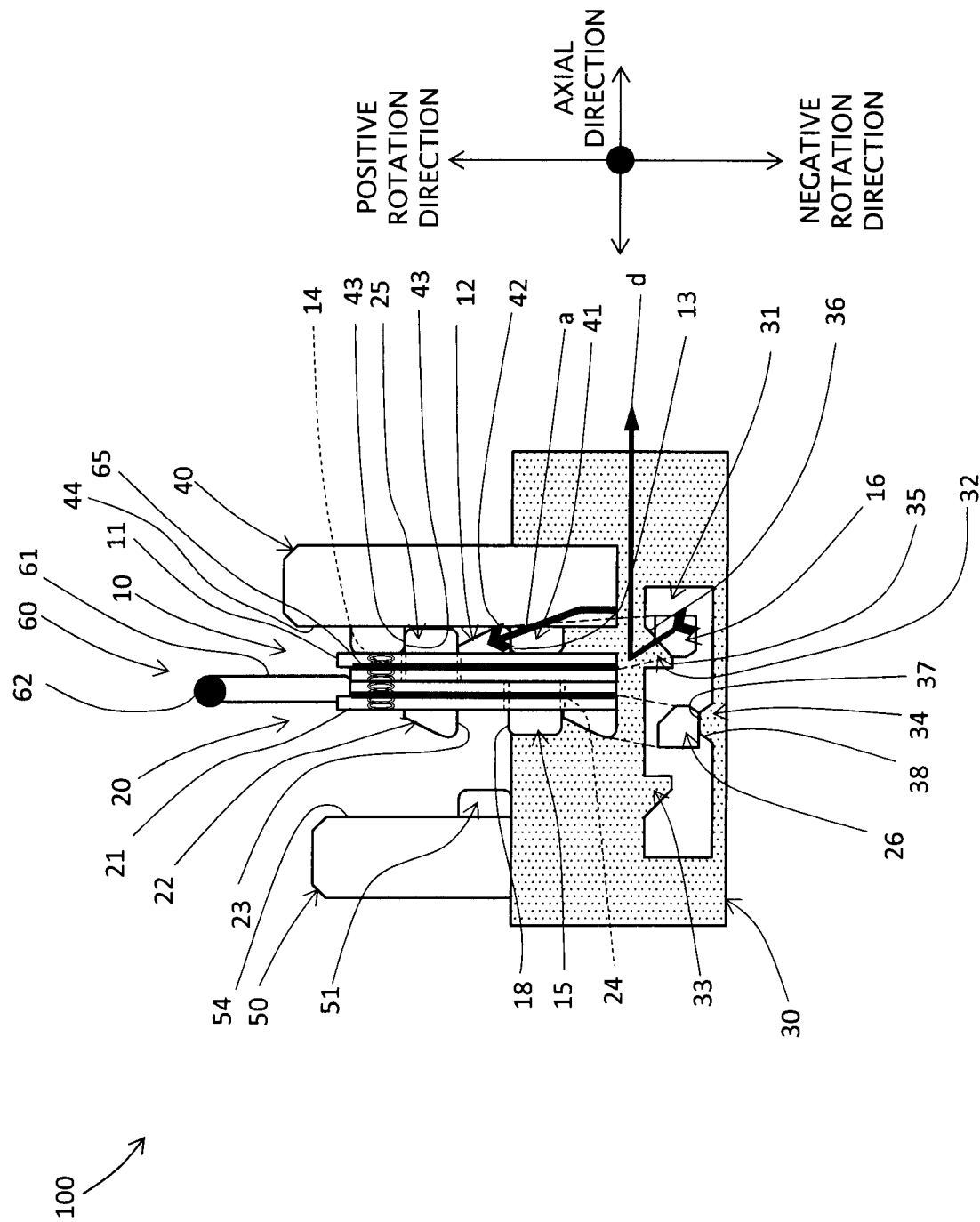

[Fig. 6]
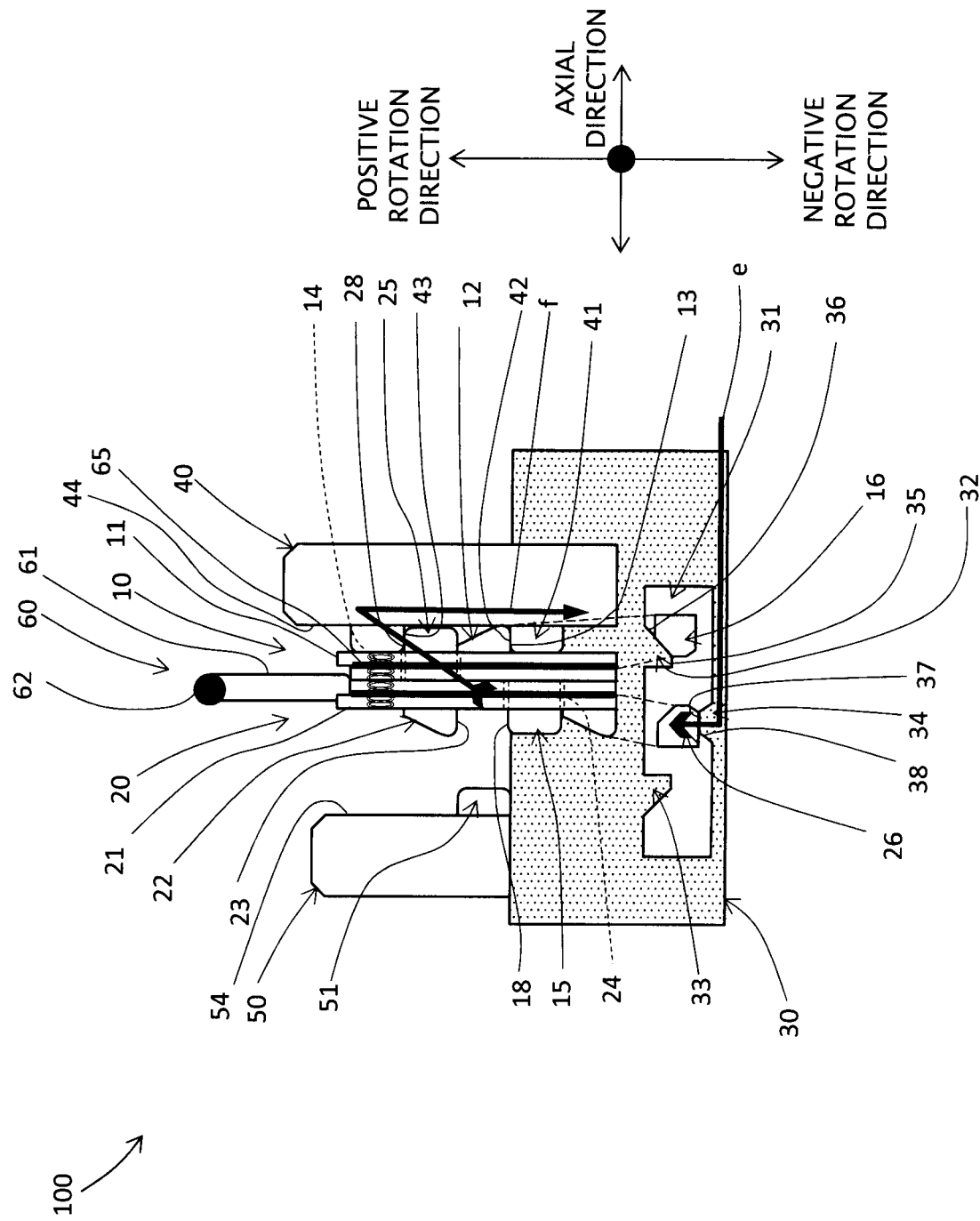

[Fig. 7]
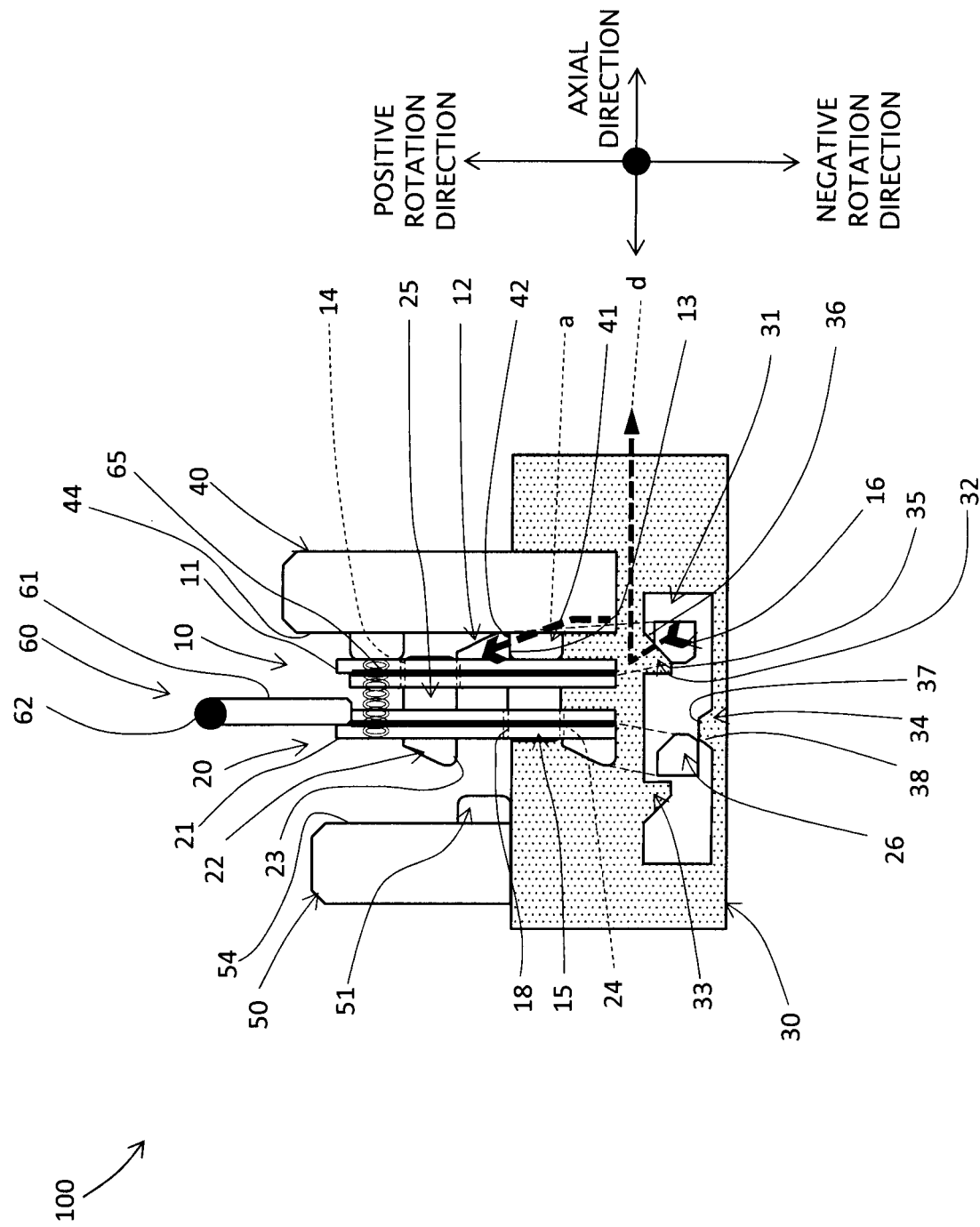

[Fig. 8]
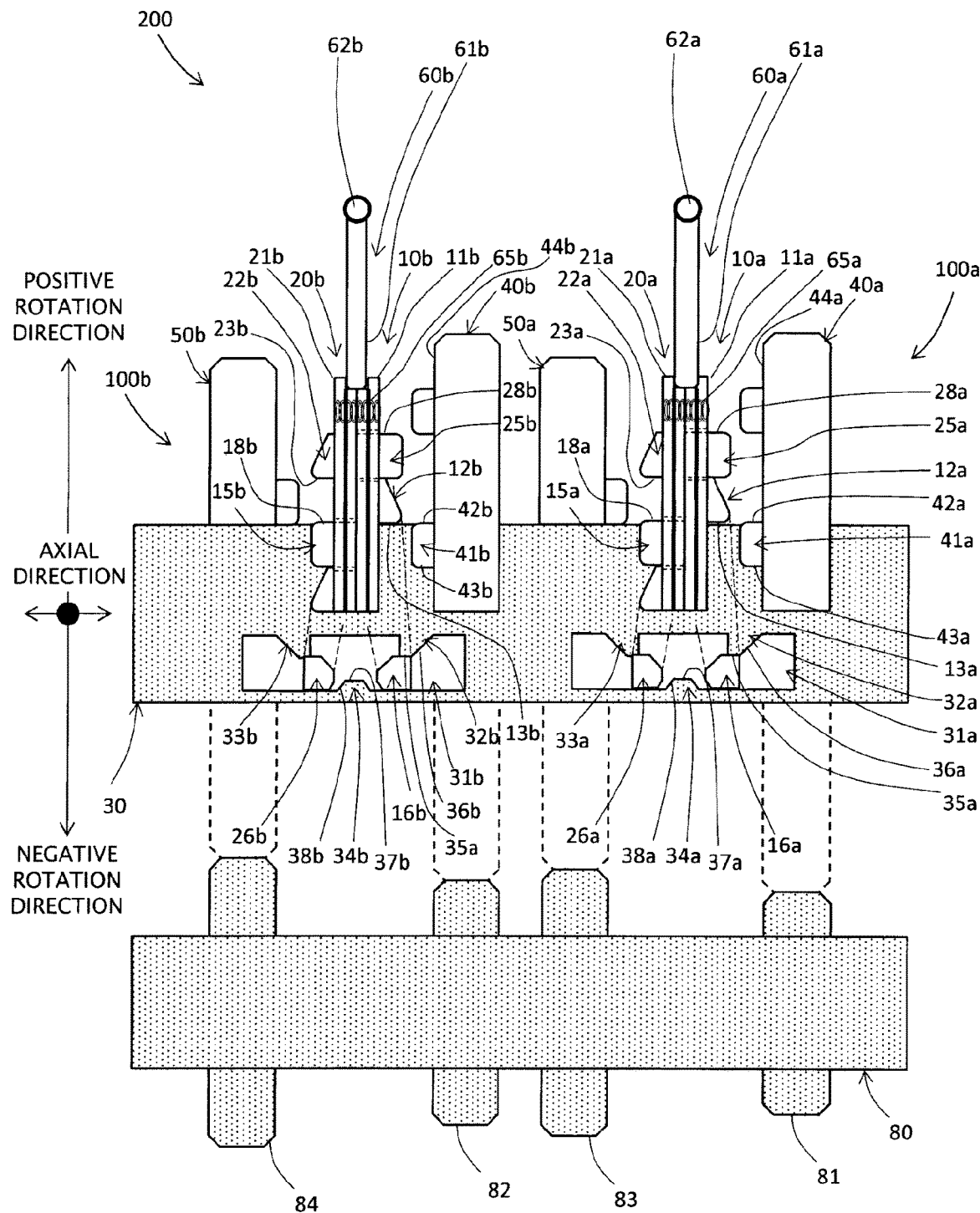

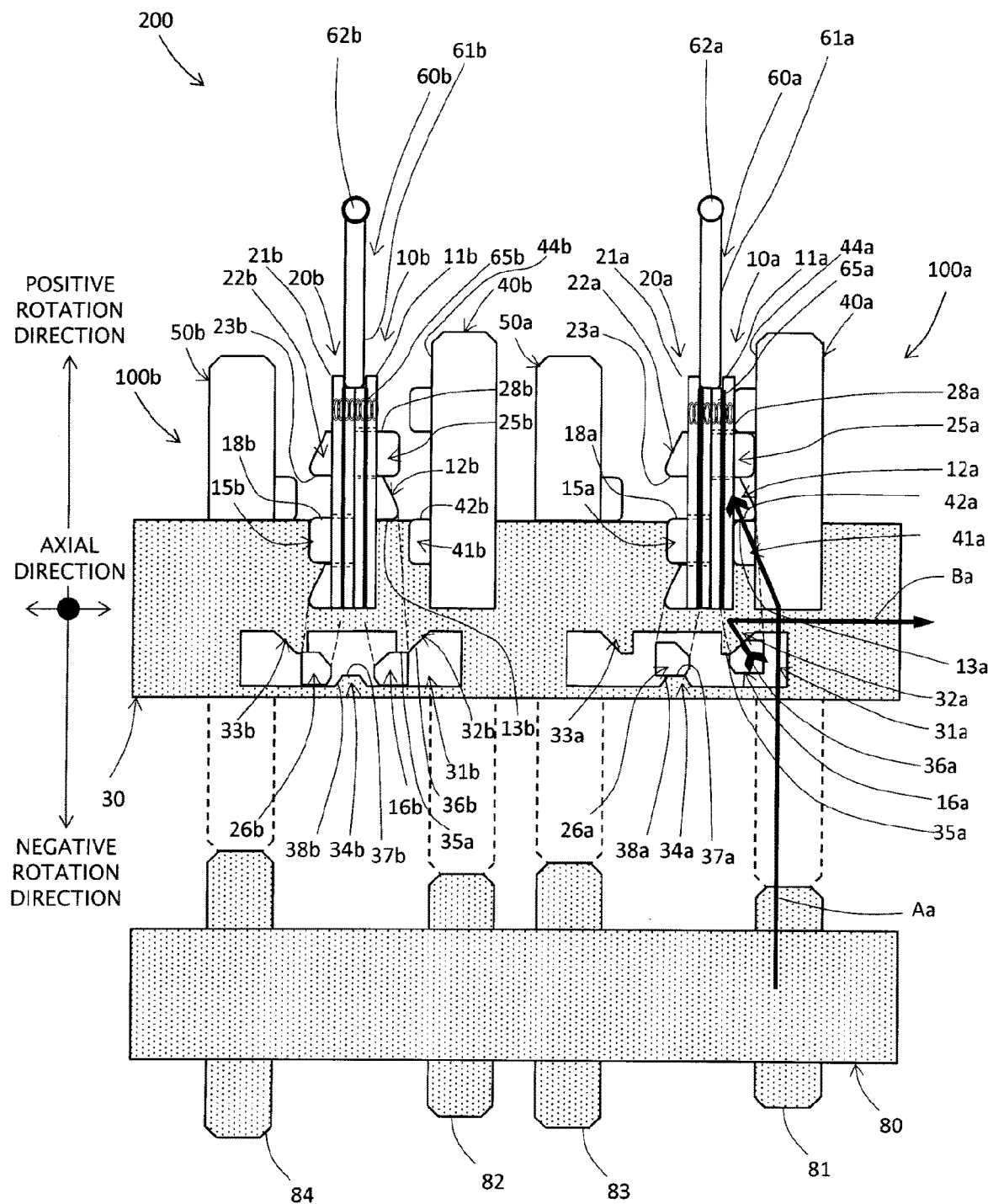
[Fig. 9]

[Fig. 10]
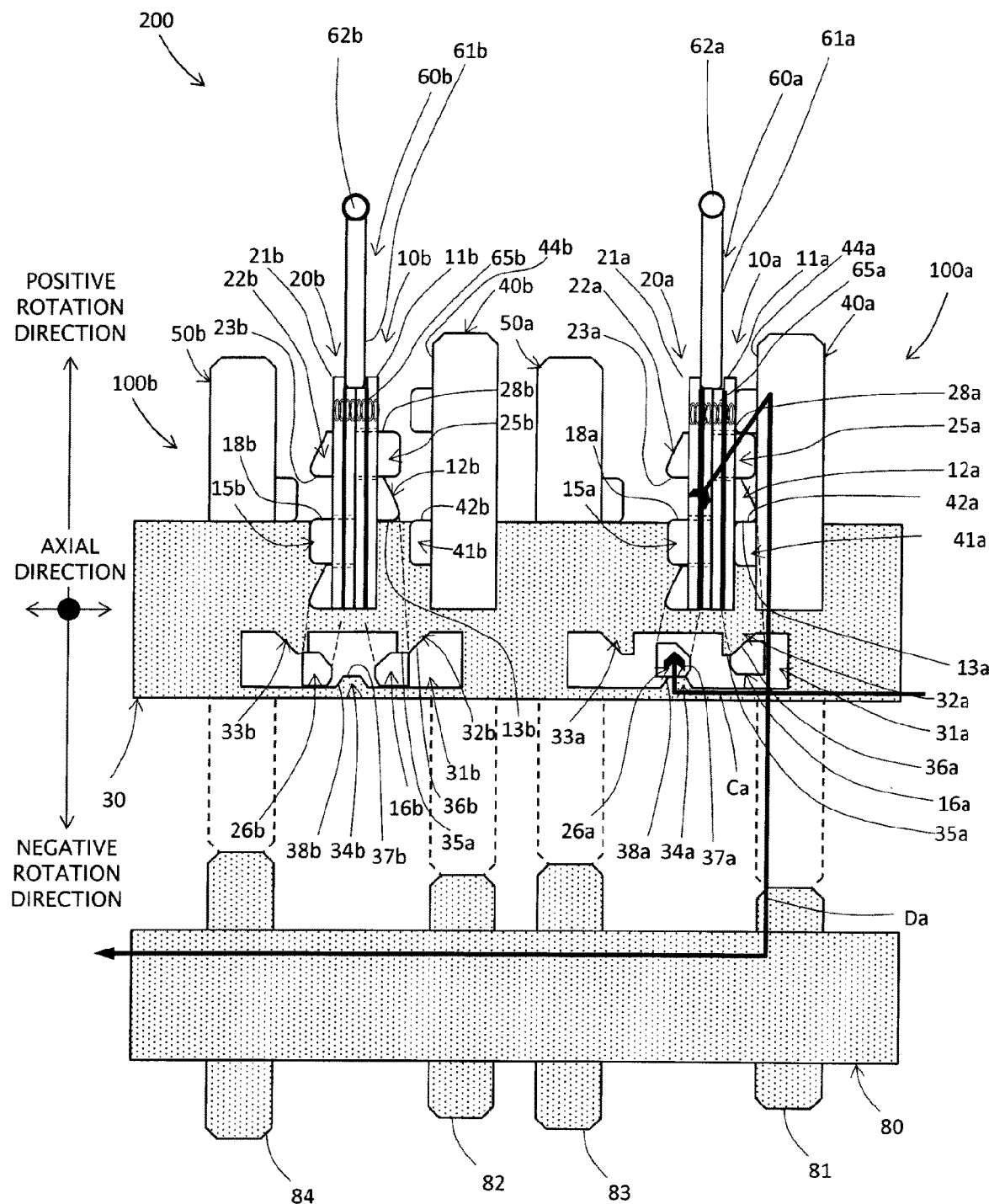

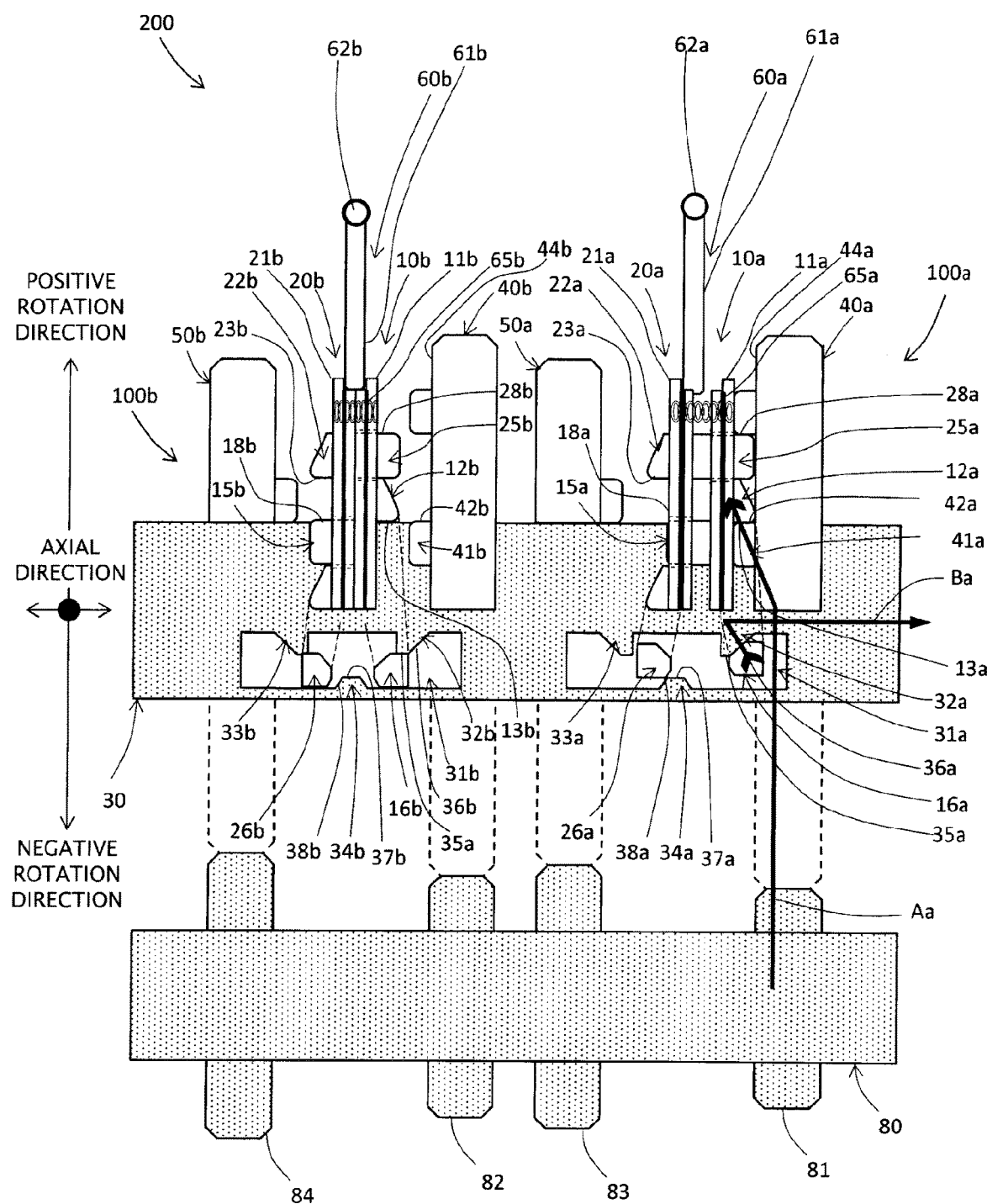
[Fig. 11]

[Fig. 12]
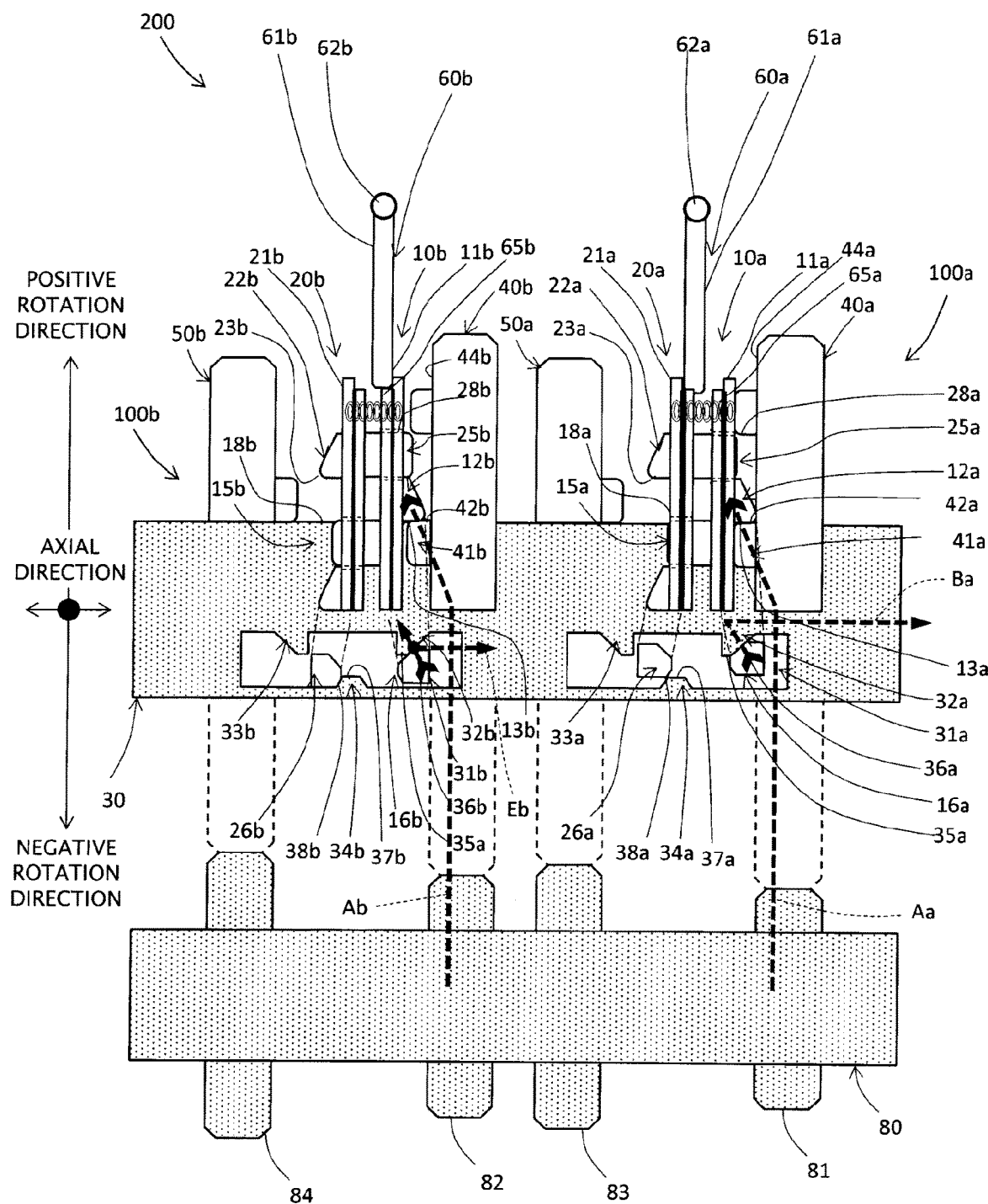

[Fig. 13]
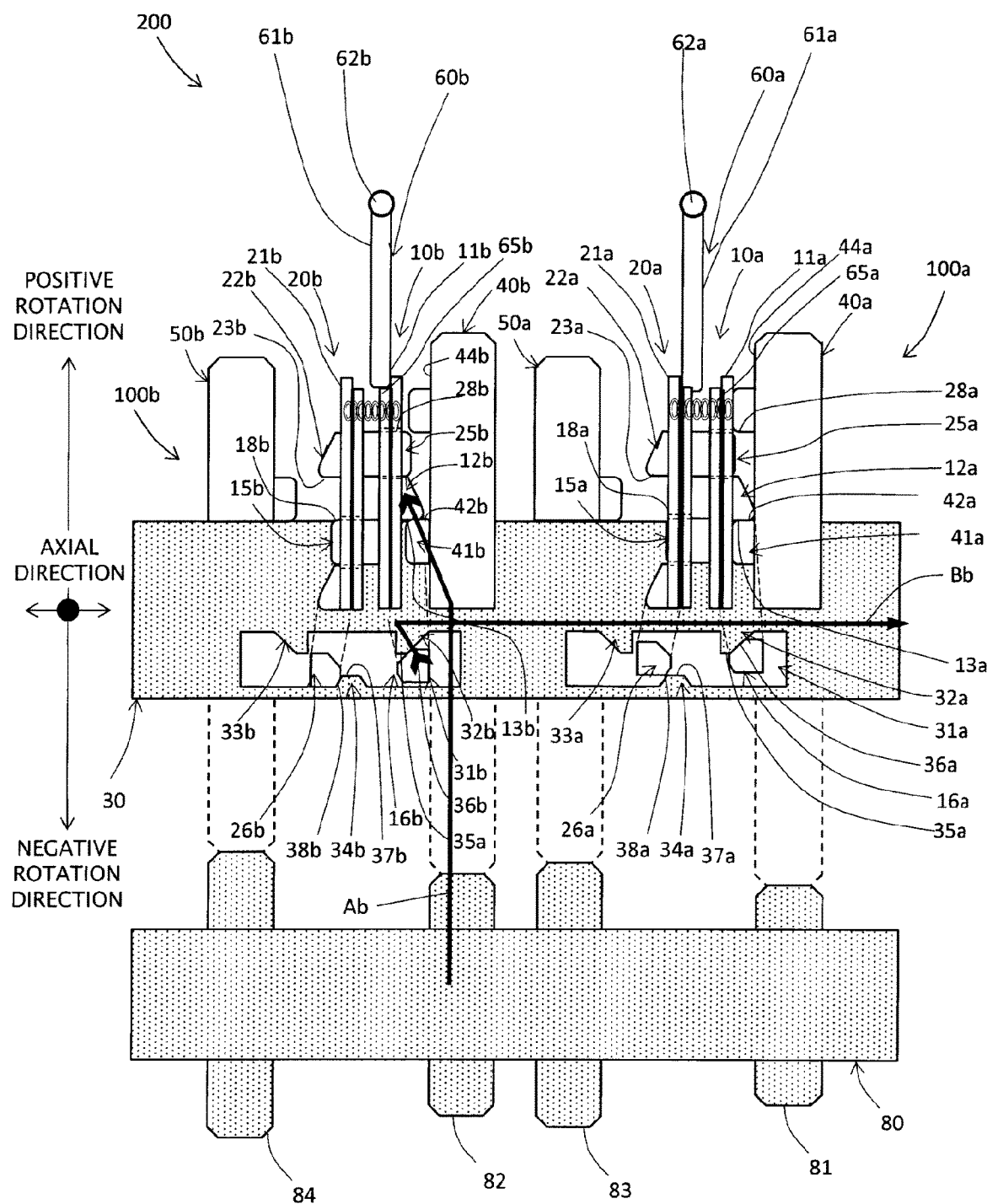

[Fig. 14]
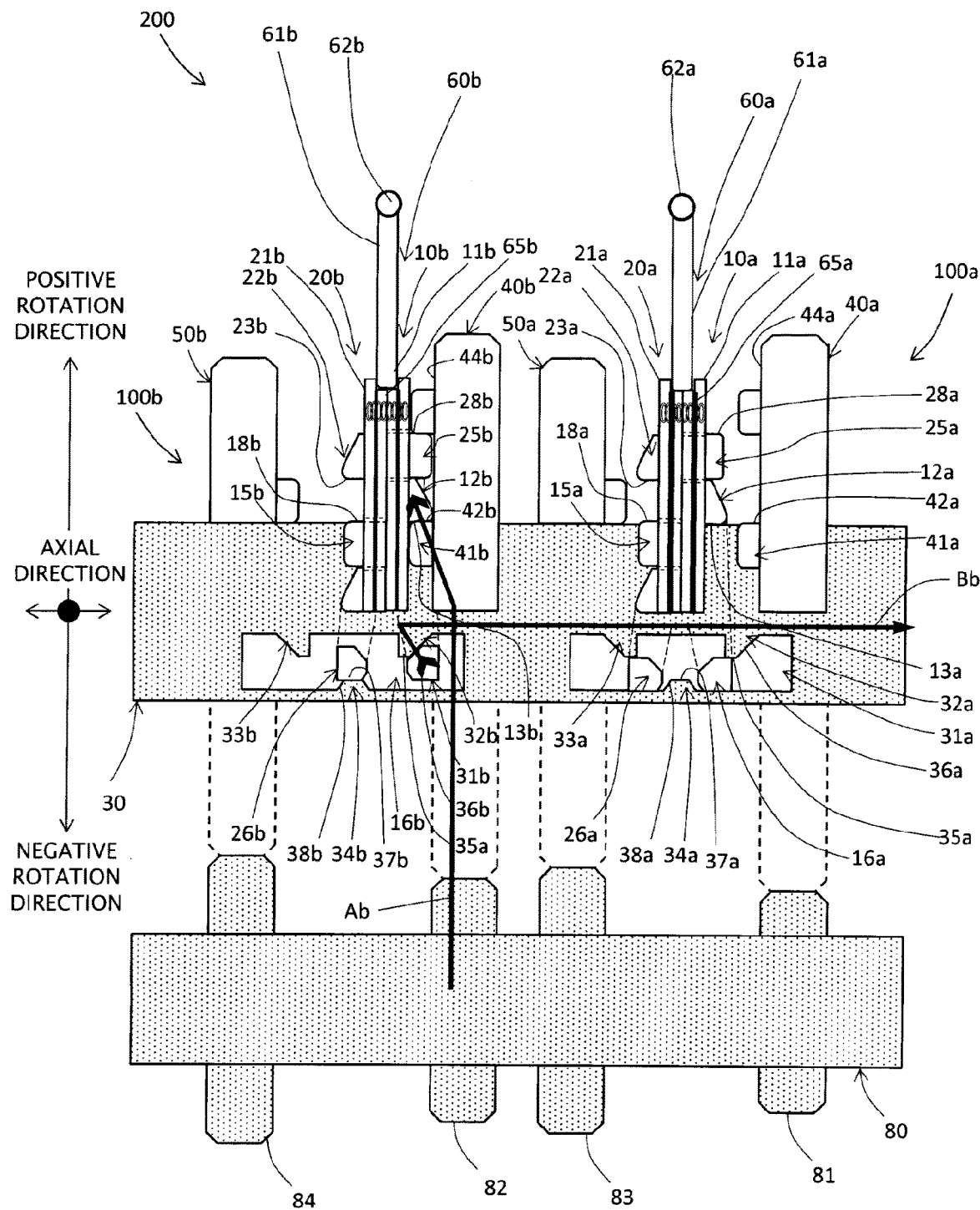

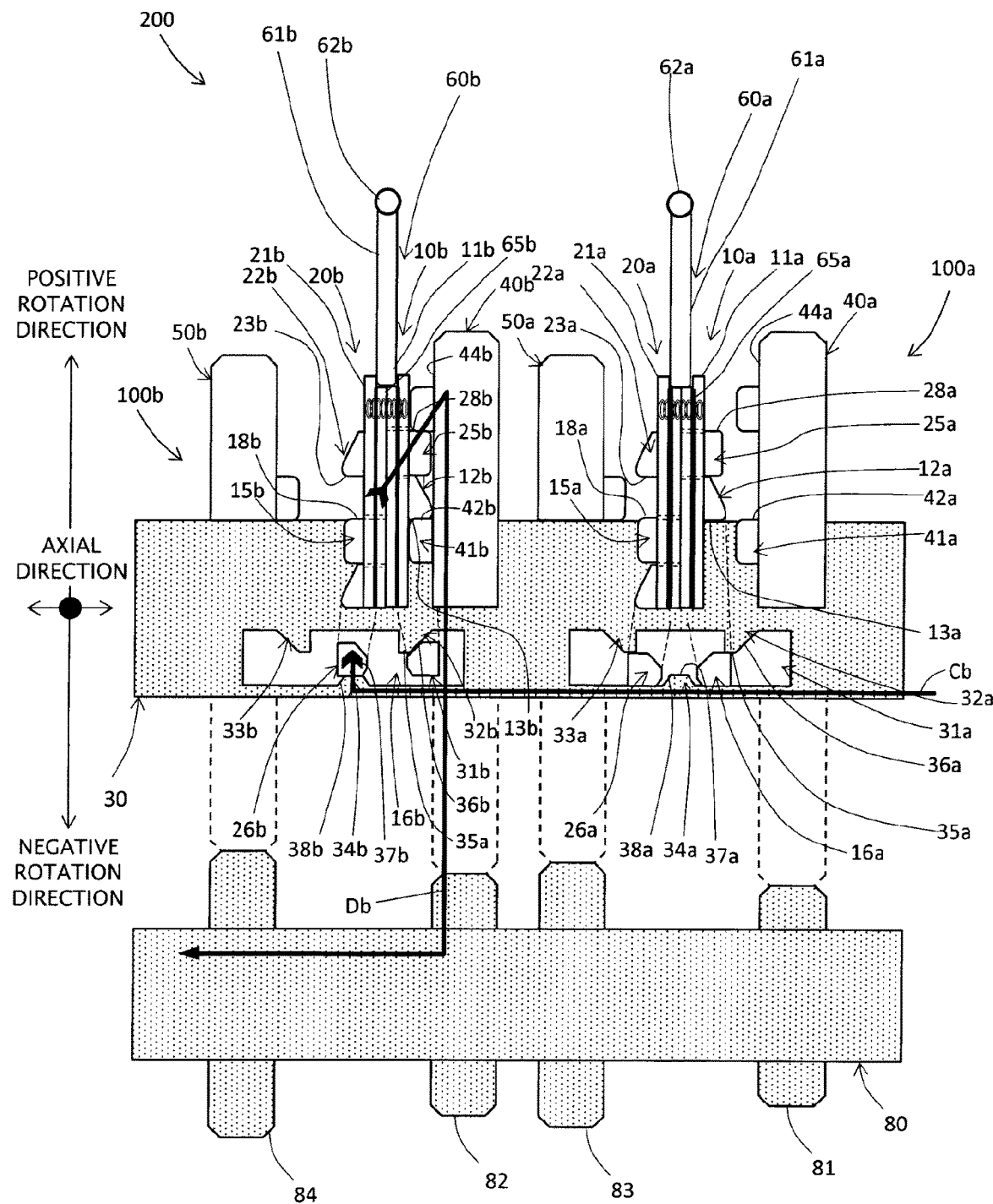
[Fig. 15]

DOG CLUTCH AND TRANSMISSION

TECHNICAL FIELD

The present disclosure relates to a structure of a dog clutch and a structure of a transmission including the dog clutch.

BACKGROUND ART

A clutch is disposed between an output shaft of an engine and a drive shaft of a vehicle and the like, to maintain or interrupt transmission of power between the engine and the drive shaft. Among various clutches, dog clutches are often used. A dog clutch includes a gear rotatably mounted on a power transmission shaft, a dog ring engaged with the power transmission shaft in an axially movable manner using a spline, and a fork for axially moving the dog ring. The dog clutch uses the fork to move the dog ring toward the gear to engage dog teeth of the gear with dog teeth of the dog ring to thereby transmit torque from the gear to the power transmission shaft, and uses the fork to move the dog ring away from the gear to disengage the dog teeth, thereby interrupting transmission of the torque.

In order to connect the dog clutch while the engine is rotating at a high speed, it is necessary to engage the dog teeth of the dog ring with the dog teeth of the gear at a high speed. JP 5707119 B, for example, therefore proposes the following technique: a slope surface which is axially inclined is formed in a groove of a spline mounted on a powered rotation shaft, and thrust toward the gear is made to act on a protrusion of the dog ring to be engaged with the slope surface of the spline groove, so that the thrust urges the dog ring onto the gear to bring the dog ring and the gear into engagement with each other at high speed. The dog clutch described in JP 5707119 B further includes a slope surface on the release side opposite the slope surface on the engagement side described above, so as to disengage the dog ring from the gear at a high speed when torque is applied in the coast direction.

CITATION LIST

Patent Literature

PTL 1: JP 5707119 B

SUMMARY OF INVENTION

Technical Problem

The related art dog clutch described in JP 5707119 B has the following disadvantage. Because the slope is formed at the base of the dog teeth, the protrusion on the dog ring may engage with the slope surface on the release side to undergo thrust in the release direction when the drive torque changes into the coast direction. Consequently, when the drive torque changes to the coast direction, the dog ring would move in the disengaging direction irrespective of the position of the fork, to come into contact with the fork, causing abrasion and reducing transmission efficiency.

The present disclosure is therefore directed at preventing contact between the dog ring and the fork to thereby prevent occurrence of abrasion and also increase the transmission efficiency.

Solution to Problem

A dog clutch according to one aspect of the disclosure includes: a gear rotatably mounted on a power transmission shaft; a first dog ring configured to be engaged with the power transmission shaft in a rotating direction and to move axially for engagement with the gear in the rotating direction, which is capable of transmitting torque in a positive rotation direction between the gear and the power transmission shaft; a second dog ring disposed adjacent to the first dog ring on a side of the first dog ring axially farther from the gear and configured to be engaged with the power transmission shaft in the rotating direction and to move axially for engagement with the gear in the rotating direction, which is capable of transmitting torque in a negative rotation direction between the gear and the power transmission shaft; a fork configured to move the first dog ring or the second dog ring axially; springs configured to pull the first dog ring and the second dog ring to bring the first dog ring and the second dog ring into pressure contact with each other axially; and cam grooves axially extending on the power transmission shaft. The cam grooves each include, on a surface in the positive rotation direction, a first parallel surface parallel to an axial direction and a first slope surface inclined from the first parallel surface toward the positive rotation direction as the first slope surface approaches the gear. The cam grooves each include, on a surface in the negative rotation direction, a second parallel surface parallel to the axial direction. The first dog ring includes first cam protrusions each configured to be engaged with the first slope surface of the corresponding cam groove to transmit the torque in the positive rotation between the first dog ring and the power transmission shaft and to receive axial thrust from the first slope surface toward the gear. The second dog ring includes second cam protrusions each configured to be engaged with the second parallel surface of the corresponding cam groove to transmit the torque in the negative rotation direction between the second dog ring and the power transmission shaft.

The first dog ring includes the first cam protrusions each configured to be engaged with the first slope surface of the corresponding cam groove to transmit torque in the positive rotation direction between the first dog ring and the power transmission shaft and to receive axial thrust from the first slope surface toward the gear. The second dog ring includes the second cam protrusions each configured to be engaged with the second parallel surface of the corresponding cam groove to transmit torque in the negative rotation direction between the second dog ring and the power transmission shaft. This structure enables the first dog ring to engage with the gear at a high speed by thrust from the first slope surface, when the torque in the positive rotation direction is applied. When the torque in the negative rotation direction is applied, the second dog ring engages with the second parallel surface to transmit the torque in the negative rotation direction, preventing application of thrust in the disengaging direction to the first and second dog rings. Therefore, when the torque in the positive rotation direction changes to the torque in the negative rotation direction, it is possible to prevent the first and second dog rings from moving in the disengaging direction into contact with the fork irrespective of the position of the fork, thereby suppressing occurrence of abrasion and increasing the transmission efficiency.

In the dog clutch of the disclosure, the fork may move the second dog ring axially away from the gear to disengage the second dog ring from the gear and disengage the second cam protrusions from the second parallel surfaces. Thereafter, when the torque in the positive rotation direction between the gear and the power transmission shaft is reduced to substantially zero, the first dog ring may be moved toward the second dog ring by a tensile force of the springs to disengage the first dog ring from the gear and disengage the first cam protrusions from the first slope surfaces.

This structure may prevent the first and second dog rings from moving in the disengaging direction irrespective of the position of the fork. It is therefore possible to prevent the first and second dog rings from coming into contact with the fork, thereby suppressing abrasion and increasing the transmission efficiency.

In the dog clutch of the disclosure, the cam grooves may each include, on a surface in the negative rotation direction, a second slope surface inclined from the second parallel surface toward the negative rotation direction as the second slope surface leaves the gear. When moving the first dog ring axially by the fork toward the gear to an engagement start position where the first dog ring and the gear start engaging with each other and the first slope surface and the corresponding first cam protrusion start engaging with each other, the second cam protrusions may each come into contact with the second slope surface to restrict axial movement of the second dog ring and prevent the second dog ring from engaging with gear and prevent the second cam protrusions from engaging with the second parallel surfaces. When the first dog ring is moved toward the gear to an engagement completion position by axial thrust toward the gear received from the first slope surface, the tensile force of the springs may cause the second dog ring to move toward the first dog ring and engage with the gear and cause the second cam protrusions to engage with the second parallel surfaces.

As described above, the dog teeth of the first dog ring are brought into the dog windows of the gear for engagement with the dog teeth of the gear, and thereafter the dog teeth of the second dog ring are brought into the dog windows. This structure enlarges the circumferential gap between the dog teeth of the gear and the dog teeth of the first dog ring and enables engagement of these dog teeth in this state. It is therefore possible to engage the first and second dog rings with the gear easily under the high rotation rate of the gear, without increasing the axial movement speed of the fork. This enables preferable engagement of the first and second dog rings even under high speed rotation while reducing the axial driving force of the fork.

A transmission according to another aspect of the disclosure includes two or more dog clutches according to the disclosure mounted on a common power transmission shaft. The two or more dog clutches include a low-speed gear dog clutch, and a high-speed gear dog clutch having a high-speed gear that rotates at a speed higher than a speed of a low-speed gear of the low-speed dog clutch. After a second dog ring of the low-speed gear dog clutch is moved axially by a fork of the low-speed gear dog clutch for disengagement from the low-speed gear, a first dog ring of the high-speed gear dog clutch is axially moved by a fork of the high-speed gear dog clutch for engagement with the high-speed gear, thereby shifting torque in a positive rotation direction transmitted by the first dog ring of the low-speed gear dog clutch to the first dog ring of the high-speed gear dog clutch. When the torque in the positive rotation direction transmitted by the first dog ring of the low-speed gear dog clutch becomes substantially zero, the first dog ring of the low-speed gear dog clutch is moved axially by springs of the low-speed gear dog clutch for disengagement from the low-speed gear, and the second dog ring of the high-speed gear dog clutch is moved axially by springs of the high-speed gear dog clutch for engagement with the high-speed gear.

This structure does not interrupt power output from the transmission when shifting gears from a low speed to a high speed and thus enables smooth gear shifting.

Advantageous Effects of Invention

The present disclosure prevents contact between the dog rings and the fork, thereby reducing occurrence of abrasion and increasing the transmission efficiency.

BRIEF DESCRIPTION OF DRAWINGS

FIG. 1 is a perspective view illustrating a structure of a dog clutch according to an embodiment of the present disclosure.

FIG. 2 is a development of a circumferential cross section schematically illustrating the structure of the dog clutch shown in FIG. 1.

FIG. 3 is a development of a circumferential cross section of the dog clutch shown in FIGS. 1 and 2, schematically illustrating engagement of first and second dog rings with a power transmission shaft, when the first dog ring starts moving toward a gear.

FIG. 4 is a development of a circumferential cross section of the dog clutch shown in FIGS. 1 and 2, schematically illustrating engagement of the first and second dog rings with the power transmission shaft, when the first dog ring is at an engagement start position.

FIG. 5 is a development of a circumferential cross section of the dog clutch shown in FIGS. 1 and 2, schematically illustrating engagement of the first and second dog rings with the power transmission shaft and transmission of torque in the positive rotation direction, when the first and second dog rings are at an engagement completion position.

FIG. 6 is a development of a circumferential cross section of the dog clutch shown in FIGS. 1 and 2, schematically illustrating engagement of the first and second dog rings with the power transmission shaft and transmission of torque in the negative rotation direction, when the first and second dog rings are at the engagement completion position.

FIG. 7 is a development of a circumferential cross section of the dog clutch shown in FIGS. 1 and 2, schematically illustrating engagement of the first and second dog rings with the power transmission shaft and transmission of torque in the positive rotation direction, when the second dog ring is at the neutral position, the first dog ring is at the engagement completion position, and the torque in the positive rotation direction transmitted by the first dog ring is substantially zero.

FIG. 8 is a development of a circumferential cross section schematically illustrating a structure of a transmission according to an embodiment of the disclosure.

FIG. 9 is a development of a circumferential cross section of the transmission illustrated in FIG. 8, schematically illustrating transmission of torque in the positive rotation direction by a first-speed gear dog clutch when the first-speed gear dog clutch is at an engagement completion position.

FIG. 10 is a development of a circumferential cross section of the transmission illustrated in FIG. 8, schematically illustrating transmission of torque in the negative rotation direction by the first-speed gear dog clutch when the first-speed gear dog clutch is at the engagement completion position.

FIG. 11 is a development of a circumferential cross section of the transmission illustrated in FIG. 8, schematically illustrating engagement of the first and second dog rings of the first-speed gear dog clutch with the power transmission shaft and transmission of torque in the positive rotation direction by the first-speed gear dog clutch, when the second dog ring of the first-speed dog clutch moves to the neutral position.

FIG. 12 is a development of a circumferential cross section of the transmission illustrated in FIG. 8, schematically illustrating engagement of the first and second dog rings of the first-speed gear dog clutch with the power transmission shaft and transmission of torque in the positive rotation direction by the first-speed gear dog clutch and engagement of the first and second dog rings of the second-speed gear dog clutch with the power transmission shaft and transmission of torque in the positive rotation direction by the second-speed gear dog clutch, when the second dog ring of the first-speed dog clutch is at the neutral position and the first dog ring of the second-speed dog clutch is at the engagement start position.

FIG. 13 is a development of a circumferential cross section of the transmission illustrated in FIG. 8, schematically illustrating the state immediately after the torque in the positive rotation direction transmitted by the first dog ring of the first-speed gear dog clutch becomes substantially zero in the state illustrated in FIG. 12.

FIG. 14 is a development of a circumferential cross section of the transmission illustrated in FIG. 8, schematically illustrating transmission of torque in the positive rotation direction by the second-speed gear dog clutch when the second-speed gear dog clutch is at the engagement completion position with respect to the second-speed gear.

FIG. 15 is a development of a circumferential cross section of the transmission illustrated in FIG. 8, schematically illustrating transmission of torque in the negative rotation direction by the second-speed gear dog clutch when the second-speed gear dog clutch is at the engagement completion position with respect to the second-speed gear.

DESCRIPTION OF EMBODIMENTS

Summary of Structure of Dog Clutch

A dog clutch 100 according to an embodiment will be described with reference to the drawings. While, in the following example, the dog clutch 100 includes two gears, a gear 40 and a gear 50, mounted on a power transmission shaft 30, the dog clutch 100 may include a single gear mounted on the power transmission shaft 30. FIG. 1 a perspective view illustrating the power transmission shaft 30, a first dog ring 10, a second dog ring 20, and the gear 50. FIGS. 2 to 7 each include two portions: a first portion above the center of the power transmission shaft 30 includes visible outlines showing side surfaces of the gear 40, the first dog ring 10, the second dog ring 20, and the gear 50, respectively, combined with development of their dog teeth 12, 15, 22, 25, 41, and 51; and a second portion below the center of the power transmission shaft 30 is a development of a circumferential section including a cam groove 31. In FIG. 2 through FIG. 7, the upward direction corresponds to a positive rotation direction, the downward direction corresponds to a negative rotation direction, and the lateral direction corresponds to an axial direction. The power transmission shaft 30 is coupled with a drive shaft of a vehicle, for example, to transmit driving force of the engine, for example, to the drive shaft of the vehicle.

As illustrated in FIGS. 1 and 2, the dog clutch 100 according to the present embodiment includes the gears 40 and 50 rotatably mounted on the power transmission shaft 30, and the first dog ring 10 and the second dog ring 20 to be engaged with the power transmission shaft 30. The power transmission shaft 30 includes cam grooves 31 axially extending on its outer surface. The first dog ring 10 includes first cam protrusions 16 protruding toward the inner circumference. By fitting the first cam protrusions 16 into the corresponding cam grooves 31, the first dog ring 10 engages with the power transmission shaft 30 in the rotation direction and is also attached onto the power transmission shaft 30 in an axially movable manner. Similarly, the second dog ring 20 includes second cam protrusions 26 protruding toward the inner circumference. By fitting the second cam protrusions 26 into the corresponding cam grooves 31, the second dog ring 20 engages with the power transmission shaft 30 in the rotation direction, and is also attached onto the power transmission shaft 30 in an axially movable manner. The first dog ring 10 is disposed facing the gear 40, and the second dog ring 20 is disposed axially adjacent to the first dog ring 10, facing a side of the first dog ring 10 farther from the gear 40.

The first dog ring 10 moves axially to engage its dog teeth 12 with the corresponding dog teeth 41 of the gear 40, thereby transmitting torque in the positive rotation direction between the gear 40 and the power transmission shaft 30. Further, engagement of the dog teeth 15 with the corresponding dog teeth 51 of the gear 50 causes the first dog ring 10 to transmit torque in the negative rotation direction between the gear 50 and the power transmission shaft 30. The second dog ring 20 moves axially to engage the dog teeth 25 with the corresponding dog teeth 41 of the gear 40, thereby transmitting torque in the negative rotation to the power transmission shaft 30. Further, engagement of the dog teeth 22 with the corresponding dog teeth 51 of the gear 50 causes the second dog ring 20 to transmit torque in the positive rotation direction between the second dog ring 20 and the power transmission shaft 30. Each element will be described in detail below.

Detailed Structure of Dog Clutch

Each of the gears 40 and 50 includes, on a first axial end surface 44 or 54, a plurality of dog teeth 41 or 51 protruding axially outward from the end surface 44 or 54. Each of the dog teeth 41 and 51 is a partially annular protrusion including a radially extending engagement surface 42 or 52 formed in the positive rotation direction and a radially extending engagement surface 43 or 53 formed in the negative rotation direction. The gears 40 and 50 are rotatably mounted on the power transmission shaft 30 via rotating bearings such as ball bearings.

The first dog ring 10 includes, on a surface of an annular body 11 facing the gear 40, a plurality of dog teeth 12 axially protruding toward the gear 40. The dog teeth 12 each include, in the negative rotation direction, a radially extending engagement surface 13 and, in the positive rotation direction, a slope surface having a decreasing height toward the positive rotation direction. The first dog ring 10 includes, toward the positive rotation direction with respect to the dog teeth 12, a plurality of through holes 14, and a corresponding one of dog teeth 25 formed on the second dog ring 20, which will be described below, passes through each of the through holes 14. The through hole 14 has a circumferentially elongated partially annular shape which is similar to the shape of the dog teeth 25. As illustrated in FIG. 1, the first dog ring 10 includes, in the peripheral portion of the body 11, a plurality of through holes 19 in which springs 65 (shown in FIG. 2) are disposed for connecting the first dog ring 10 with the second dog ring 20. The first dog ring 10 further includes, toward the inner circumferential direction on the body 11, a plurality of first cam protrusions 16 protruding from an inner circumferential surface 17 toward the inner circumferential direction.

The second dog ring 20 includes, on a surface of an annular body 21 closer to the gear 40, a plurality of dog teeth 25 axially protruding toward the gear 40. Each of the dog teeth 25 is a circumferentially elongated partially annular protrusion, and includes, in the positive rotation direction, a radially extending engagement surface 28. The second dog ring 20 further includes through holes 24 having a circumferentially elongated partially annular shape, each formed between two dog teeth 25 on the body 21, similar to the through holes 14 formed on the body 11 of the first dog ring 10. The second dog ring 20 further includes, in the peripheral portion of the body 21, a plurality of through holes 29 in which the springs 65 (shown in FIG. 2) are disposed for connecting the second dog ring 20 with the first dog ring 10. The second dog ring 20 further includes, toward the inner circumferential direction on the body 21, a plurality of second cam protrusions 26 protruding from an inner circumferential surface 27 toward the inner circumferential direction.

As illustrated in FIG. 2, the first dog ring 10 includes, on a surface of the body 11 farther from the gear 40, dog teeth 15 having the same shape as that of the dog teeth 25 of the second dog ring 20. Further, the second dog ring 20 includes, on a surface of the body 21 farther from the gear 40, dog teeth 22 having the same shape as that of dog teeth 12 of the first dog ring 10.

As illustrated in FIG. 2, the first dog ring 10 and the second dog ring 20 are pulled axially by the springs 65 into pressure contact with each other. When the first dog ring 10 and the second dog ring 20 are coupled axially in pressure contact with each other by the springs 65, the dog teeth 25 of the second dog ring 20 are each fitted into the corresponding through holes 14 of the first dog ring 10, with their leading edges being substantially aligned with leading edges of the dog teeth 12 of the first dog ring 10 formed on the surface closer to the gear 40. The dog teeth 15 of the first dog ring 10 formed on the surface farther from the gear 40 are each fitted into the corresponding through hole 24 formed on the second dog ring 20, with their leading edges being substantially aligned with leading edges of the dog teeth 22 formed on the surface of the second dog ring 20 farther from the gear 40. There are small circumferential gaps between the through holes 14 of the first dog ring 10 and the dog teeth 25 of the second dog ring 20 and between the through holes 24 of the second dog ring 20 and the dog teeth 15 of the first dog ring 10. These gaps allow the first dog ring 10 and the second dog ring 20 to be displaced circumferentially relative to each other. The spring 65 may be a coil spring or a spring of another shape such as a leaf spring or a belleville spring.

As illustrated in in FIG. 2, each of the dog teeth 12 of the first dog ring 10 and each of the dog teeth 25 of the second dog ring 20 protruding through the corresponding through hole 14 of the first dog ring 10 toward the gear 40 are located adjacent to each other circumferentially, and the total circumferential length of these adjacent teeth is slightly shorter than the circumferential length of an interval between the dog teeth 41 formed on the gear 40. This structure allows a pair consisting of the dog tooth 12 and the dog tooth 25 to be fitted into the interval between two dog teeth 41 on the gear 40. The circumferential space extending between two dog teeth 41 is called a dog window. Namely, a pair consisting of the dog tooth 12 and the dog tooth 25 can be fitted into a dog window of the gear 40. When pairs consisting of the dog teeth 12 and the dog teeth 25 are each fitted into the corresponding dog window of the gear 40, an engagement surface 13 of the dog tooth 12 in the negative rotation direction engages with an engagement surface 42 of the dog tooth 41 in the positive rotation direction to transmit torque in the positive rotation direction, and an engagement surface 28 of the dog tooth 25 in the positive rotation direction engages with an engagement surface 43 of the dog tooth 41 in the negative rotation direction to transmit torque in the negative rotation direction.

Similarly, each of the dog teeth 22 of the second dog ring 20 and each of the dog teeth 15 of the first dog ring 10 protruding through the through holes 24 of the second dog ring 20 toward the gear 50 can be fitted into the corresponding dog window between the dog teeth 51 of the gear 50. When a pair consisting of the dog tooth 22 and the dog tooth 15 is fitted into the dog window of the gear 50, an engagement surface 23 of the dog tooth 22 in the negative rotation direction engages with an engagement surface of the dog tooth 51 in the positive rotation direction to transmit torque in the positive rotation direction, and an engagement surface 18 of the dog teeth 15 in the positive rotation direction engages with an engagement surface of the dog teeth 51 in the negative rotation to transmit torque in the negative rotation direction.

As illustrated in FIGS. 1 and 2, the power transmission shaft 30 includes, on its surface where the first dog ring 10 and the second dog ring 20 are mounted, cam grooves 31 extending axially. On a surface of each cam groove 31 in the positive rotation direction, two convex portions 32 and 33 having a trapezoidal shape are formed axially side by side. On a surface of the cam groove 31 in the negative rotation direction between the convex portions 32 and 33, a convex portion 34 having a trapezoidal shape is further formed. The convex portion 32 has a trapezoidal shape protruding from the surface of the cam groove 31 in the positive rotation direction toward the negative rotation direction, and includes a first parallel surface 35 at the leading edge which is parallel to the axial direction, and a first slope surface 36 which is sloped from the first parallel surface 35 toward the positive rotation direction as it approaches the gear 40 from the first parallel surface 35. The convex portion 33, similar to the convex portion 32, includes a surface at the leading edge which is parallel to the axial direction, and a slope surface which is sloped from the parallel surface toward the positive rotation direction as it approaches the gear 50 from the parallel surface. The surface of the cam groove 31 in the positive rotation direction between the convex portion 32 and the convex portion 33 is parallel to the axial direction.

The convex portion 34 formed on the surface of the cam groove 31 in the negative rotation has a trapezoidal shape protruding from the surface of the cam groove 31 in the negative rotation direction toward the positive rotation direction. The convex portion 34 includes a second parallel surface 37 at the leading edge which is parallel to the axial direction, and a second slope surface 38 which is sloped from the second parallel surface 37 toward the negative rotation direction as it leaves the gear 40. The convex portion 34 includes, on the side closer to the gear 40, a slope surface which is sloped from the second parallel surface 37 toward the negative rotation direction as it leaves the gear 50. The surface of the cam groove 31 in the negative rotation direction other than the convex portion 34 is parallel to the axial direction.

The first cam protrusion 16 of the first dog ring 10, illustrated in FIGS. 1 and 2, has a substantially pentagonal circumferential cross section which is to be fitted into the corresponding cam groove 31, as illustrated in FIG. 2. The first cam protrusion 16 includes a surface in the positive rotation direction and a surface in the negative rotation direction which are parallel to the axial direction, a slope surface toward the positive rotation direction parallel to the first slope surface 36 of the convex portion 32, and a slope surface toward the negative rotation direction parallel to the surface of the convex portion 34 sloped toward the gear 40. The second cam protrusion 26 of the second dog ring 20 has a substantially pentagonal circumferential cross section which is to be fitted into the corresponding cam groove 31, and includes a surface in the positive rotation direction and a surface in the negative rotation direction which are parallel to the axial direction, a slope surface toward the positive rotation direction parallel to the slope surface of the convex portion 33, and a slope surface toward the negative rotation direction parallel to the second slope surface 38 of the convex portion 34 formed farther from the gear 40.

As illustrated in FIG. 2, a fork 60 is disposed between the first dog ring 10 and the second dog ring 20 for axially moving the first dog ring 10 or the second dog ring 20. The fork 60 has a tip end 61 having a shape which is engageable with the first and second dog rings 10 and 20, and a base portion 62 which is connected with an actuator not shown.

Movement of Dog Clutch

Referring to FIG. 2 to FIG. 7, movement of the dog clutch 100 according to the embodiment will be described. In the following description, it is assumed that the dog clutch 100 intermittently transmits power between a drive shaft of a vehicle and an engine, and that the gears 40 and 50 continuously engage with a gear mounted on the output shaft of the engine which is not shown.

FIG. 2 illustrates a state in which the first dog ring 10 and the second dog ring 20 are in a neutral position and are not engaged with the gear 40 or the power transmission shaft 30. Hereinafter, this state will be referred to as a neutral state. In this state, the gear 40 is rotating at a predetermined rotation rate by a gear attached to the output shaft of the engine which is not shown. The first cam protrusions 16 of the first dog ring 10 and the second cam protrusions 26 of the second dog ring 20 engage with the cam grooves 31 of the power transmission shaft 30, and the first dog ring 10 and the second dog ring 20 are rotating at the same rotation rate as that of the power transmission shaft 30. In the state illustrated in FIG. 2, the rotation rate of the gear 40 is higher than the rotation rate of the power transmission shaft 30. In the neutral state, the output of the engine is not transmitted to the power transmission shaft 30.

As illustrate in FIG. 3, when the fork 60 is moved toward the gear 40 (to the right in FIG. 3), the first dog ring 10 engaged with the tip end 61 of the fork 60 moves toward the gear 40. At this time, the second dog ring 20 coupled with the first dog ring 10 by the springs 65 also moves toward the gear 40. This movement of the second dog ring 20 toward the gear 40 brings the slope surfaces of the second cam protrusions 26 of the second dog ring 20 formed closer to the gear 40 into contact with the second slope surfaces 38 of the convex portions 34 formed farther from the gear 40, as illustrated in FIG. 3. This prevents further movement of the second dog ring 20 toward the gear 40, so that the dog teeth 25 of the second dog ring 20 would not enter the dog windows of the gear 40. Therefore, the second dog ring 20 would not engage with the gear 40, which would prevent the second cam protrusions 26 from engaging with the second parallel surfaces 37.

The first dog ring 10, on the other hand, moves further toward the gear 40 by the fork 60. Therefore, the springs 65 which have maintained the first dog ring 10 and the second dog ring 20 in a pressure contact state axially extend to increase the interval between the first dog ring 10 and the second dog ring 20. Then, as illustrated in FIG. 3, the leading edges of the dog teeth 12 of first dog ring 10 enter the respective dog windows between the dog teeth 41 of the gear 40. At this time, the slope surfaces in the positive rotation direction of the first cam protrusions 16 of the first dog ring 10 partially come in contact with the first slope surfaces 36 of the convex portions 32 of the cam grooves 31. This position of the first dog ring 10 corresponds to an engagement start position of the first dog ring 10.

As illustrated in FIG. 3, when the leading edge of each of the dog teeth 12 of the first dog ring 10 enters the corresponding dog window of the gear 40, the associated dog tooth 25 of the second dog ring 20 does not enter the dog window, and therefore a large circumferential interval is formed between each of the dog teeth 12 and two dog teeth 41 that form the dog window. Because the rotation rate of the gear 40 is higher than the rotation rate of the power transmission shaft 30, when the dog teeth 12 each enter the corresponding dog window, of the two dog teeth 41 of the gear 40, the dog tooth 41 in the negative rotation direction moves in the positive rotation direction (upward in FIG. 3) with respect to the dog teeth 12, as illustrated in FIG. 4. This movement brings the engagement surface 42 of the dog tooth 41 in the positive rotation direction into engagement with the engagement surface 13 of the dog tooth 12 in the negative rotation direction. This engagement between the dog teeth 41 and the dog teeth 12 transmits torque in the positive rotation direction from the gear 40 to the first dog ring 10 as indicated by arrow a in FIG. 4. The torque in the positive rotation direction then causes the first dog ring 10 to rotate slightly in the positive rotation with respect to the power transmission shaft 30, to further engage the slope surfaces in the positive rotation direction of the first cam protrusions 16 of the first dog ring 10 with the first slope surfaces 36 of the cam grooves 31. This results in transmission of torque in the positive rotation direction from the first cam protrusions 16 to the power transmission shaft 30 as indicated by arrow b in FIG. 4.

The first slope surface 36 of the convex portion 32 of the cam groove 31 is inclined with respect to the axial direction as illustrated in FIG. 4. Therefore, transmission of the torque in the positive rotation direction from the first cam protrusions 16 to the power transmission shaft 30 applies axial thrust to the first cam protrusions 16 toward the gear 40 as a reaction force, as indicated by c in FIG. 4. As illustrated in FIG. 5, this thrust moves the first dog ring 10 toward the gear 40 until the leading edges of the dog teeth 12 come into contact with the axial end surface 44 of the gear 40. This position of the first dog ring 10 corresponds to an engagement completion position of the first dog ring 10.

On the other hand, because the second cam protrusions 26 of the second dog ring 20 engage with the second slope surfaces 38 of the cam grooves 31 to restrict the axial movement of the second dog ring 20, the movement of the first dog ring 10 toward the gear 40 in the state illustrated in FIG. 4 causes the springs 65 to further extend. When the tensile force of the springs 65 increases sufficiently to enable the second cam protrusions 26 to move axially along the second slope surfaces 38, the second dog ring 20 is pulled by the tensile force of the springs 65 axially until it comes into pressure contact with the first dog ring 10 axially, as illustrated in FIG. 5. At this time, the second dog ring 20 moves circumferentially relative to the first dog ring 10. When the second dog ring 20 comes into pressure contact with the first dog ring 10, the second cam protrusions 26 engage with the second parallel surfaces 37 of the cam grooves 31. Further, the dog teeth 25 of the second dog ring 20 are guided along the through holes 14 of the first dog ring 10 to enter the dog windows such that the dog teeth 25 are adjacent to the dog teeth 12, with the engagement surfaces 28 in the positive rotation direction being engaged with the engagement surfaces 43 of the dog teeth 41 in the negative rotation direction. This position of the second dog ring 20 corresponds to an engagement completion position of the second dog ring 20.

When both the first and second dog rings 10 and 20 move to the engagement completion position, engagement between the first dog ring 10 and the gear 40 completes, and, as indicated by arrows a and d in FIG. 5, torque in the positive rotation is transmitted from the gear 40 via the first dog ring 10 to the power transmission shaft 30. Further, as indicated by arrows e and f in FIG. 6, torque in the negative rotation direction is transmitted from the power transmission shaft 30 via the second dog ring 20 to the gear 40. As illustrated in FIG. 5, when the torque in the positive rotation direction is transmitted from the gear 40 via the first dog ring 10 to the power transmission shaft 30, the first cam protrusion 16 receives thrust from the first slope surface 36 toward the gear 40, so that the first dog ring 10 and the second dog ring 20, which is in pressure contact with the first dog ring 10 by a tensile force of the springs 65, remain engaged with the gear 40.

To disengage the dog clutch 100 from the gear 40, the fork 60 is used to move the second dog ring 20 away from the gear 40 to the neutral position illustrated in FIG. 2, while the transmission torque in the positive rotation direction is being applied, as illustrated in FIG. 7. This movement disengages the second dog ring 20 from the gear 40, and also disengages the second cam protrusions 26 from the second parallel surfaces 37. In this state, the first dog ring 10 is urged against the gear 40 by the torque in the positive rotation direction and does not move from the engagement completion position, as illustrated in FIG. 7. Therefore, the movement of the second dog ring 20 to the neutral position axially extends the springs 65.

When the torque in the positive rotation direction becomes substantially zero in this state, the thrust urging the first dog ring 10 toward the gear 40 is no longer applied, so that the first dog ring 10 is pulled by the second dog ring 20 via the springs 65 and moves away from the gear 40. This movement disengages the first dog ring 10 from the gear 40 and simultaneously disengages the first cam protrusions 16 from the first slope surfaces 36. The first dog ring 10 thus returns to the neutral position illustrated in FIG. 2.

The dog clutch 100 may also engage the dog teeth 15 and 22 of the first and second dog ring 10 and 20, respectively, with the dog teeth 51 of the gear 50 by moving the fork 60 toward the gear 50. In this case, the first dog ring 10 transmits torque in the negative rotation direction to the gear 50, and the second dog ring 20 transmits torque in the positive rotation direction to the gear 50. Movements for engaging and disengaging the first dog ring 10 and the second dog ring 20 with and from the gear 50 are similar to those described above with reference to FIG. 2 to FIG. 7.

As described above, in the dog clutch 100 according to the embodiment, when torque in the positive rotation direction is transmitted from the gear 40 via the first dog ring 10 to the power transmission shaft 30, the first cam protrusions 16 receive thrust toward the gear 40 from the first slope surfaces 36. Consequently, the first dog ring 10 and the second dog ring 20, which is in pressure contact with the first dog ring 10 by the tensile force of the springs 65, remain engaged with the gear 40, as shown in FIG. 5. When torque in the negative rotation direction is transmitted from the power transmission shaft 30 via the second dog ring 20 to the gear 40, the torque in the negative rotation direction is transmitted to the power transmission shaft 30 via the second parallel surfaces 37. Thus, to transmit the torque in the negative rotation direction, no thrust in the direction away from the gear 40; that is, in the disengaging direction, is applied to the second dog ring 20. This prevents the dog clutch from being released when the torque in the negative rotation direction is applied, unlike the related art dog clutch described in JP 5707119 B. Further, the dog clutch 100 is configured to move the second dog ring 20 to the neutral position using the fork 60 to thereby disengage the second dog ring 20 from the gear 40.

The dog clutch 100 of the embodiment therefore prevents the first or second dog ring 10 or 20 from moving in the disengaging direction irrespective of the location of the fork 60. This structure further avoids generation of abrasion caused by contact between the fork 60 and the first and second dog rings 10 and 20 and an associated reduction in the transmission efficiency.

In the dog clutch 100 of the embodiment, as the dog teeth 25 of the second dog ring 20 enter the dog windows after the dog teeth 12 of the first dog ring 10 enter the dog windows of the gear 40 for engagement with the dog teeth 41 of the gear 40, the dog teeth 41 and the dog teeth 12 of the first dog ring 10 can be engaged with each other with a large circumferential gap being maintained between the dog teeth 12 and 41. This structure enables the first and second dog rings 10 and 20 to easily engage with gear 40 without increasing the axial moving rate of the fork 60 when the rotation rate of gear 40 is high. It is therefore possible to engage the first and second dog rings 10 and 20 even while the gear 40 is rotating at a high rate, while reducing the axial driving force of the fork 60.

Structure of Transmission

A transmission 200 of the embodiment will now be described with reference to FIG. 8 to FIG. 15. The dog clutch 100 which has been described above with reference to FIG. 1 to FIG. 7 is mounted, as a first-speed gear dog clutch 100a and a second-speed gear dog clutch 100b, on a common power transmission shaft 30 to constitute a four-speed transmission 200 to be installed on a vehicle. In FIG. 8 to FIG. 15, the same elements as those of the dog clutch 100 described above with reference to FIG. 1 to FIG. 7 are designated by the same reference numerals having indexes "a" for the first-speed gear dog clutch 100a on the right and by the same reference numerals having indexes "b" for the second-speed gear dog clutch 100b on the left, and description of these elements will not be repeated.

Referring to FIG. 8 to FIG. 15, the gears 40a, 40b, 50a, and 50b of the transmission 200 are continuously engaged with first-speed to fourth-speed gears 81 through 84 mounted on an output shaft 80 of the engine. The gear 40b rotates at a higher speed than the gear 40a. The first-speed gear dog clutch 100a and the gear 40a correspond to a low-speed gear dog clutch and a low-speed gear described in the claims, respectively, and the second-speed gear dog clutch 100b and the gear 40b correspond to a high-speed gear dog clutch and a high-speed gear described in the claims, respectively.

The transmission 200 illustrated in FIG. 8 to FIG. 15 moves the second dog ring 20a of the first dog clutch 100a axially by the fork 60a of the first-speed dog clutch 100a for disengagement from the gear 40a, and thereafter moves the first dog ring 10b of second-speed dog clutch 100b axially by the fork 60b of the second-speed dog clutch 100b for engagement with the gear 40b, thereby transferring the torque in the positive rotation direction transmitted by the first dog ring 10a of the first-speed gear dog clutch 100a to the first dog ring 10b of the second-speed gear dog clutch 100b. When the torque in the positive rotation direction transmitted by the first dog ring 10a of first-speed gear dog clutch 100a becomes substantially zero, the transmission 200 moves the first dog ring 10a of the first-speed gear dog clutch 100a axially by the springs 65a of the first-speed gear dog clutch 100a for disengagement from the gear 40a, and also moves the second dog ring 20b of the second-speed gear dog clutch 100b axially by the springs 65b of second-speed dog clutch 100b for engagement with gear 40b.

FIGS. 8 to 15 include two portions in combination: a first portion above the center of the power transmission shaft 30 includes visible outlines showing side surfaces of the gears 40a and 40b, the first dog rings 10a and 10b, the second dog rings 20a and 20b, and the gears 50a and 50b, respectively, combined with development of their dog teeth 12a, 12b, 15a, 15b, 22a, 22b, 25a, 25b, 41a, 41b, 51a, and 51b; and a second portion below the center of the power transmission shaft 30 is a development of a circumferential section including cam grooves 31a and 31b. In FIG. 8 through FIG. 15, the upward direction corresponds to a positive rotation direction, the downward direction corresponds to a negative rotation direction, and the lateral direction corresponds to the axial direction.

Referring to FIG. 8 to FIG. 15, base portions 62a and 62b of forks 60a and 60b of the first-speed gear dog clutch 100a and the second-speed gear dog clutch 100b of the transmission 200 are connected to an actuator which is not shown, and move axially.

Referring now to FIG. 8 to FIG. 15, there will be described movement for shifting (shift-up) from a neutral state in which the first dog rings 10a and 10b and the second dog rings 20a and 20b are not engaged with the gears 40a and 40b, respectively, at the neutral position, to a first-speed gear selected state in which the gear 40a engaged with the first-speed gear 81 engages with the first and second dog rings 10a and 20a, and movement for shifting from the first-speed gear selected state to a second-speed gear selected state in which the gear 40b engaged with the second-speed gear 82 engages with the first and second dog rings 10b and 20b.

Neutral Statek

FIG. 8 illustrates the neutral state in which the first dog rings 10a and 10b and the second dog rings 20a and 20b are in the neutral state and are not engaged with the gears 40a and 40b, respectively, at the neutral position. The first-speed to fourth-speed gears 81 through 84 mounted on the output shaft 80 of the engine rotate at a predetermined rotation rate by rotations of the engine, and the gears 40a, 40b, 50a, and 50b engaged with the gears 81 through 84, respectively, rotate at a rotation rate determined by a gear ratio between the corresponding engaging gears. The power transmission shaft 30, the first and second dog rings 10a and 20a of the first-speed gear dog clutch 100a, and the first and second dog rings 10b and 20b of the second-speed gear dog clutch 100b rotate at a rotation rate lower than that of the gear 40a. No torque is transmitted from the output shaft 80 of the engine to the power transmission shaft 30.

Shift to First-Speed Gear Selected State

As illustrated in FIG. 9, when the actuator which is not shown moves the fork 60a of the first-speed gear dog clutch 100a toward the gear 40a, the first dog ring 10a and the second dog ring 20a engage with the gear 40a in the engagement completion position, by the movement similar to that described above with reference to FIG. 3. This movement causes a shift from the neutral state to the first-speed gear selected state in which the gear 40a engaged with the first-speed gear 81 and the first and second dog rings 10a and 20a engage with each other. In the first-speed gear selected state, as indicated with arrows Aa and Ba in FIG. 9, torque in the positive rotation direction is transmitted from the output shaft 80 of the engine, via the first-speed gear 81, the gear 40a, the first dog ring 10a, the first cam protrusions 16a, and the first slope surfaces 36a, to the power transmission shaft 30. Further, as described above with reference to FIG. 6, torque in the negative rotation direction is transmitted from the power transmission shaft 30, via the second parallel surfaces 37a, the second cam protrusions 26a, the second dog ring 20a, the gear 40a, and the first-speed gear 81, to the output shaft 80 of the engine, as indicated by arrows Ca and Da in FIG. 10.

Shift from First-Seed Gear Selected State to Second-Speed Gear Selected State

As illustrated in FIG. 11, when the actuator which is not shown moves the fork 60a of the first-speed gear dog clutch 100a away from the gear 40 in the first-speed gear selected state, with the torque in the positive rotation direction being transmitted from the output shaft 80 of the engine to the power transmission shaft 30, the second dog ring 20a moves to the neutral position, as in the case described above with reference to FIG. 7. This movement disengages the second dog ring 20a of the first-speed gear dog clutch 100a from the gear 40a. At this time, the first dog ring 10a is maintained at the engagement completion position with the gear 40 by thrust toward the gear 40 generated by the torque in the positive rotation direction, while the springs 65 are axially extended.

Then, as illustrated in FIG. 12, when the actuator not shown moves the fork 60b of the second-speed gear dog clutch 100b toward the gear 40b to the engagement start position of the first dog ring 10b, the dog teeth 12b of the first dog ring 10b partially engage with the dog teeth 41b of the gear 40b, and also the first cam protrusions 16b engage with the first slope surfaces 36b, as in the case described above with reference to FIG. 3 to FIG. 5. Further, the torque in the positive rotation direction starts being transmitted from the output shaft 80 of the engine, via the gear 40b, the first dog ring 10b, the first cam protrusions 16b, and the first slope surfaces 36b, to the power transmission shaft 30.

In this state, the torque in the positive rotation direction is being transmitted from the output shaft 80 of the engine to the power transmission shaft 30 via two gears: that is, the gear 40a and the gear 40b. Because the gear 40b rotates at a higher speed than the gear 40a, when starting transmission of the torque in the positive rotation direction by the gear 40b, the torque in the positive rotation which has been transmitted via the gear 40a of the first-speed gear dog clutch 100a so far shifts to the torque to be transmitted to the power transmission shaft 30 via the gear 40b of the second-speed dog clutch 100b, as illustrated in FIG. 13. This reduces the torque in the positive rotation direction which has been transmitted to the power transmission shaft 30 via the gear 40a of the first-speed gear dog clutch 100a to substantially zero. This further leads to a reduction in the thrust urging the first cam protrusions 16a onto the gear 40a to substantially zero, so that the first dog ring 10a moves to the neutral position where the first dog ring 10a is in pressure contact with the second dog ring 20a by the tensile force of the springs 65a, as illustrated in FIG. 14.

The first dog ring 10b of the second-speed dog clutch 100b moves to the engagement completion position where the leading edges of the dog teeth 12b contact the axial end surface 44b of the gear 40b by the thrust toward the gear 40b which acts on the first cam protrusions 16b. Further, the second dog ring 20b whose axial movement has been restricted by the engagement of the second cam protrusions 26b with the second slope surfaces 38 of the cam groove 31b moves, by the tensile force of the springs 65, from the engagement start position to the engagement completion position. This movement completes a shift from the first-speed gear selected state to the second-speed gear selected state in which the gear 40b engaged with the second-speed gear 82 engages with the first and second dog rings 10b and 20b.

Upon completion of the shift to the second-speed gear selected state, as illustrated in FIG. 14, the torque in the positive rotation direction is transmitted from the output shaft 80 of the engine, via the gear 40b of the second-speed gear dog clutch 100b, the first dog ring 10b, the first cam protrusions 16b, and the first slope surfaces 36b, to the power transmission shaft 30. Further, as illustrated in FIG. 15, the torque in the negative rotation direction is transmitted from the power transmission shaft 30, via the second parallel surfaces 37b of the second-speed dog clutch 100b, the second cam protrusions 26b, the second dog ring 20b, the gear 40b, and second-speed gear 82, to the output shaft 80 of engine.

The transmission 200 described above transmits the torque in the positive rotation direction from the output shaft 80 of the engine to the power transmission shaft 30 via two gears: the gear 40a of the first-speed gear dog clutch 100a and the gear 40b of the second-speed gear dog clutch 100b In this state, with the torque in the positive rotation direction which has been transmitted via the gear 40a being shifted to the torque to be transmitted, via the gear 40b, to the power transmission shaft 30, the first-speed gear selected state is shifted to the second-speed gear selected state. This mechanism prevents the power output from the transmission 200 during gear shift from being blocked, thereby enabling smooth gear shifting.

The transmission 200, similar to the dog clutch 100 described above, can prevent the first dog rings 10a and 10b and the second dog rings 20a, 20b from moving in the disengaging direction irrespective of the positions of the forks 60a and 60b, thereby avoiding generation of abrasion caused by contact of the forks 60a and 60b with the first dog rings 10a and 10b and the second dog rings 20a and 20b and avoiding a reduction in the transmission efficiency. The transmission 200 also can, similar to the dog clutch 100, engage the first dog rings 10a and 10b and the second dog rings 20a and 20b with the gears 40a and 40b easily, without increasing the axial moving rate of the forks 60a and 60b when the gears 40a and 40b are rotating at a high speed rate. This mechanism allows desirable engagement of the first dog rings 10a and 10b and the second dog rings 20a and 20b during high speed rotations while reducing the axial driving force of forks 60a and 60b.

The present disclosure is not limited to the examples described above and may include all modifications and corrections which do not depart from the technical scope or gist of the disclosure defined in the claims.

REFERENCE SIGNS LIST 10, 10a, 10b first dog ring
11, 21 body
12, 12a, 12b, 15, 15a, 15b, 22, 22a, 22b, 25, 25a, 25b, 41, 41a, 41b, 51, 51a, 51b dog teeth
13, 18, 23, 28, 42, 43, 52, 53 engagement surface
14, 19, 24, 29 through hole
16, 16a, 16b first cam protrusion
17, 27 inner circumferential surface
20, 20a, 20b second dog ring
26, 26a, 26b second cam protrusion
30 power transmission shaft
31, 31a, 31b cam groove
32, 33, 34 convex portion
35, 35a, 35b first parallel surface
36, 36a, 36b first slope surface
37, 37a, 37b second parallel surface
38, 38a, 38b second slope surface
40, 40a, 40b, 50, 50a, 50b, 81, 82, 83, 84 gear
44, 44a, 44b, 54, 54a, 54b axial end surface
60, 60a, 60b fork
61, 61a, 61b tip end
62, 62a, 62b base portion
65 spring
80 output shaft
100 dog clutch
100a first-speed gear dog clutch
100b second-speed gear dog clutch
200 transmission

The invention claimed is:

1. A dog clutch, comprising:
a gear rotatably mounted on a power transmission shaft;
a first dog ring configured to be engaged with the power transmission shaft in a rotating direction, the first dog ring being configured to move axially for engagement with the gear in the rotating direction, the first dog ring being capable of transmitting torque in a positive rotation direction between the gear and the power transmission shaft;
a second dog ring disposed adjacent to the first dog ring on a side of the first dog ring axially farther from the gear, the second dog ring being configured to be engaged with the power transmission shaft in the rotating direction, the second dog ring being configured to move axially for engagement with the gear in the rotating direction, the second dog ring being capable of transmitting torque in a negative rotation direction between the gear and the power transmission shaft;
a fork configured to move the first dog ring or the second dog ring axially;
springs configured to pull the first dog ring and the second dog ring to bring the first dog ring and the second dog ring into pressure contact with each other axially; and
cam grooves axially extending on the power transmission shaft,
the cam grooves each including, on a surface in the positive rotation direction, a first parallel surface parallel to an axial direction and a first slope surface inclined from the first parallel surface toward the positive rotation direction as the first slope surface approaches the gear, the cam grooves each including, on a surface in the negative rotation direction, a second parallel surface parallel to the axial direction,
the first dog ring including first cam protrusions each configured to be engaged with the first slope surface of the corresponding cam groove to transmit the torque in the positive rotation between the first dog ring and the power transmission shaft and to receive axial thrust from the first slope surface toward the gear,
the second dog ring including second cam protrusions each configured to be engaged with the second parallel surface of the corresponding cam groove to transmit the torque in the negative rotation direction between the second dog ring and the power transmission shaft.

2. The dog clutch according to claim 1, wherein the second dog ring is moved axially by the fork away from the gear to disengage the second dog ring from the gear and disengage the second cam protrusions from the second parallel surfaces, and thereafter, when the torque in the positive rotation direction between the gear and the power transmission shaft is reduced to substantially zero, the first dog ring is moved toward the second dog ring by a tensile force of the springs to disengage the first dog ring from the gear and disengage the first cam protrusions from the first slope surfaces.

3. The dog clutch according to claim 2, wherein the cam grooves each include, on a surface in the negative rotation direction, a second slope surface inclined from the second parallel surface toward the negative rotation direction as the second slope surface leaves the gear, when moving the first dog ring axially by the fork toward the gear to an engagement start position where the first dog ring and the gear start engaging with each other and the first slope surface and the corresponding first cam protrusion start engaging with each other, the second cam protrusions each come into contact with the second slope surface to restrict axial movement of the second dog ring, thereby preventing the second dog ring from engaging with gear and preventing the second cam protrusions from engaging with the second parallel surfaces, and when the first dog ring is moved toward the gear to an engagement completion position by axial thrust toward the gear received from the first slope surface, the tensile force of the springs causes the second dog ring to move toward the first dog ring and engage with the gear and causes the second cam protrusions to engage with the second parallel surfaces.

4. A transmission comprising two or more dog clutches according to claim 1 mounted on a common power transmission shaft, the two or more dog clutches including a low-speed gear dog clutch and a high-speed gear dog clutch having a high-speed gear that rotates at a speed higher than a speed of a low-speed gear of the low-speed gear dog clutch, wherein after a second dog ring of the low-speed gear dog clutch is moved axially by a fork of the low-speed gear dog clutch for disengagement from the low-speed gear, a first dog ring of the high-speed gear dog clutch is axially moved by a fork of the high-speed gear dog clutch for engagement with the high-speed gear, thereby shifting torque in a positive rotation direction transmitted by the first dog ring of the low-speed gear dog clutch to the first dog ring of the high-speed gear dog clutch, and, when the torque in the positive rotation direction transmitted by the first dog ring of the low-speed gear dog clutch becomes substantially zero, the first dog ring of the low-speed gear dog clutch is moved axially by springs of the low-speed gear dog clutch for disengagement from the low-speed gear, and the second dog ring of the high-speed gear dog clutch is moved axially by springs of the high-speed gear dog clutch for engagement with the high-speed gear.

* * * * *